(12) United States Patent
Uchiyama

(10) Patent No.: US 6,677,939 B2
(45) Date of Patent: *Jan. 13, 2004

(54) STEREOSCOPIC IMAGE PROCESSING APPARATUS AND METHOD, STEREOSCOPIC VISION PARAMETER SETTING APPARATUS AND METHOD AND COMPUTER PROGRAM STORAGE MEDIUM INFORMATION PROCESSING METHOD AND APPARATUS

(75) Inventor: Shinji Uchiyama, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/512,828

(22) Filed: Feb. 25, 2000

(65) Prior Publication Data

US 2003/0179198 A1 Sep. 25, 2003

(30) Foreign Application Priority Data

Aug. 7, 1999 (JP) .......................................... 11-194802

(51) Int. Cl.⁷ .............................................. G06T 17/00
(52) U.S. Cl. ..................................................... 345/419
(58) Field of Search ................................ 345/419, 426, 345/427, 422, 156, 629; 348/44, 47, 43, 51, 53, 48, 55–57; 382/106, 154

(56) References Cited

PUBLICATIONS

Colin Ware (Dynamic Stereo Displays: ACM 1995).*
Barnard et al ("Computational Stereo": ACM 1982).*
van de Grind ("Vision and the Graphical Simulation of Spatial Structure": ACM 1986 Workshop on Interactive 3D Graphics, University of North Carolina, Chapel Hill).*

* cited by examiner

Primary Examiner—Almis R. Jankus
(74) Attorney, Agent, or Firm—Fitzpatrick, Cella, Harper & Scinto

(57) ABSTRACT

A stereoscopic vision parameter is determined on the basis of the 3D space data to be displayed and the disparity distance at which the left- and right-eye images look displaced from each other in a predetermined 2D rendering space. In determining a parameter, the disparity distance between left and right image data of an object point in the 3D space is set in advance, which appears when the image data are rendered in the 2D rendering space, and the position of a displaced point which is separated from the coordinates of the object point in the 2D rendering space in the base line length direction of the observer by the disparity distance is computed. The coordinates of this displaced point in a 3D space are computed. In addition, the base line length is determined on the basis of the distance between the 3D coordinates of the displaced point and the object point.

27 Claims, 28 Drawing Sheets

MAXIMUM DISPARITY AMOUNT
APPEARING ON SCREEN (x, y) SPACE (xi,yi)

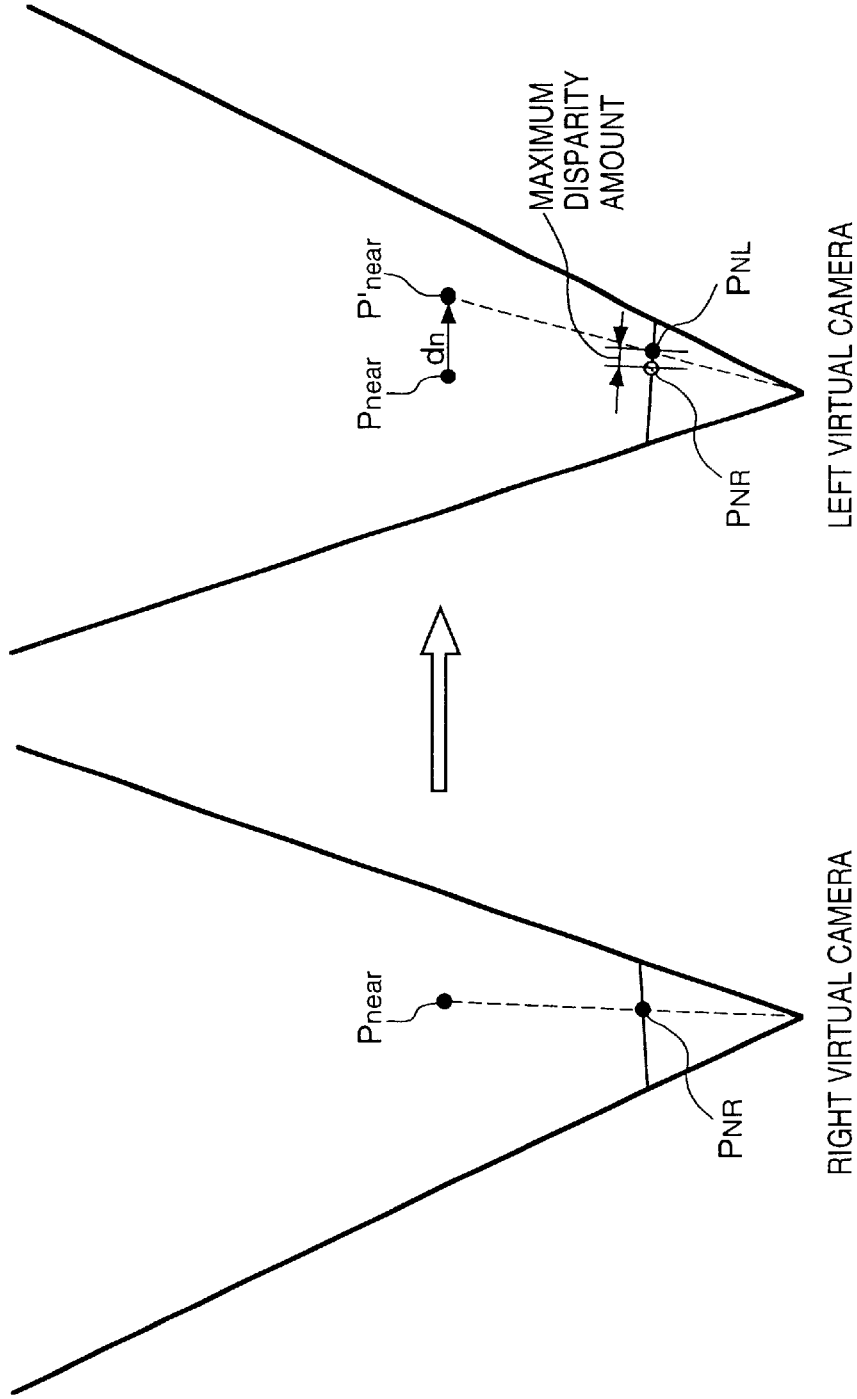

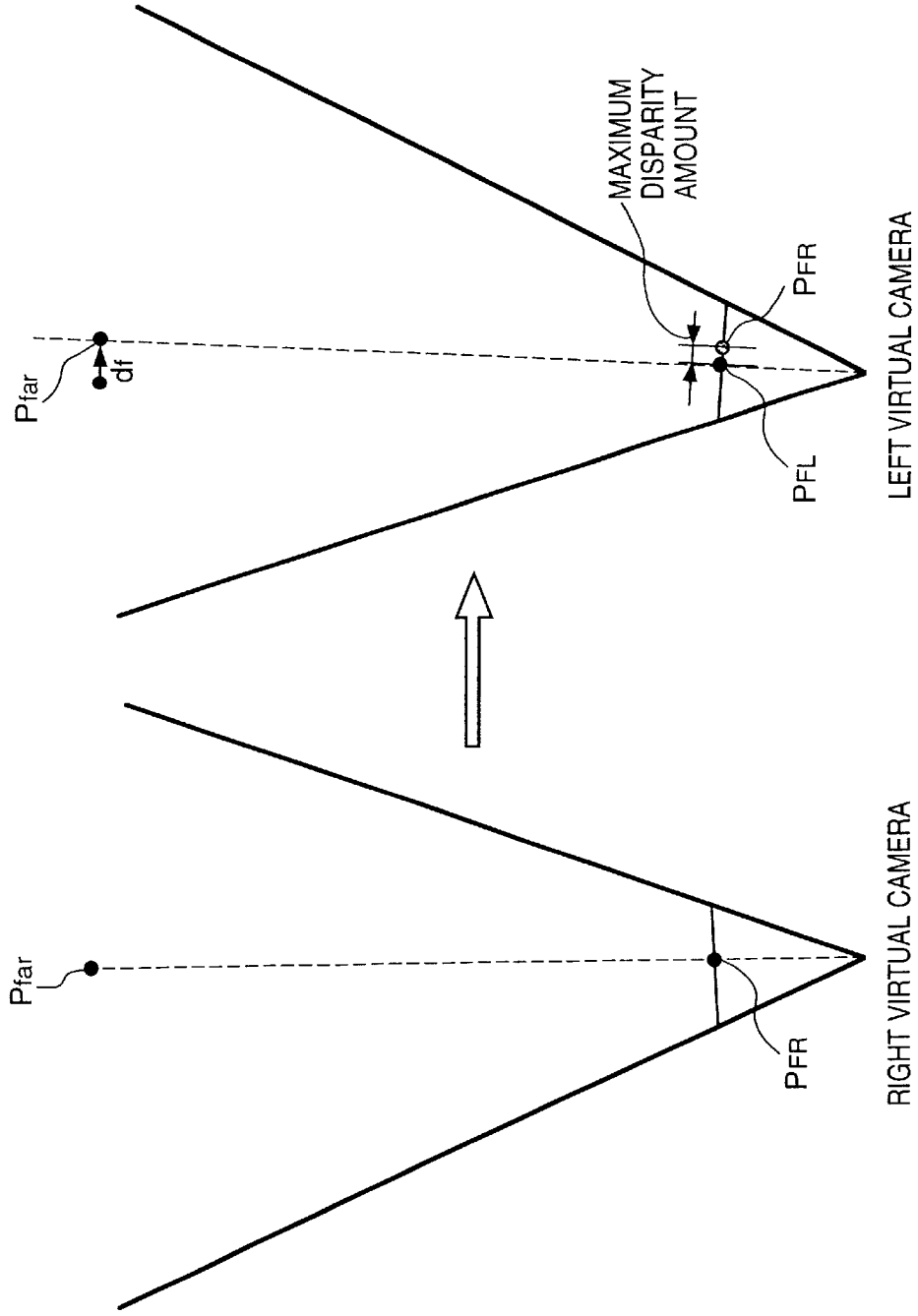

STEREOSCOPIC IMAGE PROCESSING APPARATUS AND METHOD, STEREOSCOPIC VISION PARAMETER SETTING APPARATUS AND METHOD AND COMPUTER PROGRAM STORAGE MEDIUM INFORMATION PROCESSING METHOD AND APPARATUS

FIELD OF THE INVENTION

The present invention relates to a stereoscopic image processing apparatus for converting space data described in a language dealing with 3D virtual spaces, e.g., a VRML (Virtual Reality Modeling Language), into image data that can be stereoscopically viewed, a stereoscopic vision parameter setting apparatus, and a stereoscopic image display apparatus, and methods for these apparatuses.

BACKGROUND OF THE INVENTION

With the recent advances in the performance of computers, 3D computer graphics (CG) have been rapidly popularized. Along with this trend, the WWW (Word Wide Web) on the Internet has rapidly become widespread, and the VRML (virtual Reality Modeling Language) has been standardized as a language dealing with a 3D space on the WWW and widely used.

The latest version of this language, which has been currently released, VRML2.0, is used for the construction of a virtual mall for electronic commerce, management of 3D data such as CAD data in an intranet, and the like.

The present applicant has developed a rear-cross lenticular type 3D display (3D display will be referred to as a stereoscopic display apparatus to distinguish it from a 2D display apparatus) as a stereoscopic display apparatus that allows the observer to directly perceive depth. Many stereoscopic display apparatus, other than this display apparatus proposed by the present applicant, have been proposed.

To display a 3D space described in VRML2.0, a VRML viewer apparatus is required. General VRML viewer apparatuses are just 2D display apparatuses (to be referred to as "two-dimensional display apparatuses" hereinafter in association with "stereoscopic display apparatuses") which uses general monitors to display final images although the described space is a 3D space.

This is because the conventional VRML apparatus cannot efficiently generate images for stereoscopic vision, and hence is not suited for real-time reproduction of stereoscopic images. In addition, some parameters for implementing stereoscopic vision (to be referred to as stereoscopic vision parameters hereinafter) are not supported by VRML2.0, and hence stereoscopic vision cannot be realized in practice.

Stereoscopic vision parameters are parameters associated with base line length, convergence angle, field of view, and the like. In stereoscopically displaying a target such as a 3D geometric model, virtual space, or virtual object, when the unit or value of the size of the target is clear, the target can be displayed to allow the observer to perceive the size and obtain stereoscopic vision. If, for example, an erroneous base line length is set, stereoscopic vision cannot be ensured. It is therefore important to properly set the initial values of stereoscopic vision parameters.

In consideration of this point, the present applicant has proposed a technique of setting the initial value of base line length based on the whole size of a 3D space so as to ensure stereoscopic vision, and setting the convergence angle to 0° (i.e., parallel vision) in Japanese Patent Laid-Open (Kokai) No. 2000-020757 (Jan. 21, 2000).

Problems associated with stereoscopic vision parameters are not limited to the time of initial setting.

For example, while a walkthrough system is provided for the user who is experiencing a virtual space, the viewpoint conditions (viewpoint position and visual axis direction) for observation of a target dynamically change. For this reason, even if the initial values of base line length and convergence angle are properly set, the base line length and convergence angle must be dynamically changed in accordance with changes in viewpoint conditions as walkthrough progresses.

To meet this demand, the present applicant has proposed a technique of allowing the user to dynamically change the above stereoscopic vision parameters through a graphic user interface provided on the display screen of a stereoscopic display in Japanese Patent Laid-Open No. 2000-020757.

Japanese Patent Laid-Open No. 2000-020757 has proposed initial values and real-time values of stereoscopic vision parameters.

In this conventional technique, however, since stereoscopic vision parameters are set through a user interface, it is impossible to dynamically change the stereoscopic parameters following change of the viewpoint conditions (viewpoint position, visual axis direction). Therefore, it is necessary to stop viewpoint moving operation and manually change the stereoscopic parameters. Also, according to the method of setting initial value of base line length based on the whole size of the space, there is a problem where an optimum value is not always obtained for a visible part of the space.

Setting the initial value of convergence angle to 0° can also ensure stereoscopic vision. This, however, does not necessarily provide desired stereoscopic vision.

Note that the challenge of setting the initial vales and real-time values of stereoscopic vision parameters is not limited to a system handling VRML data. This challenge is posed in handling every space data as long as it is 3D space data having no stereoscopic vision parameters set or 3D space data in a virtual space in which stereoscopic image data or stereoscopic vision parameters must be dynamically changed.

SUMMARY OF THE INVENTION

The present invention has been made in consideration of the above prior art and techniques proposed by the present applicant, and has as its object to provide an image processing apparatus and parameter setting apparatus which automatically set optimal initial values of stereoscopic vision parameters.

It is another object of the present invention to provide an image processing apparatus and parameter setting apparatus which automatically update the optimal real-time values of stereoscopic vision parameters.

It is still another object of the present invention to provide an image processing apparatus and parameter setting apparatus which set optimal values of stereoscopic vision parameters in accordance with the needs of a user or observer.

In order to achieve the above object, according to a preferred aspect of the present invention, there is provided a stereoscopic image processing apparatus for obtaining stereoscopic vision of an arbitrary object by displaying left- and right-eye images of the object, characterized by comprising:

parameter determining means for determining a stereoscopic vision parameter on the basis of image data of one of the left- and right-eye images and displacement information representing a displacement distance between the left- and right-eye images in a 2D rendering space; and output means for using the determined stereoscopic vision parameter for stereoscopic vision output of the left- and right-eye images.

If, for example, base line length as a stereoscopic vision parameter is set to the displacement distance in a 3D space, stereoscopic vision is ensured. That is, a stereoscopic vision parameter is set without troubling the user or observer.

According to another preferred aspect of the present invention, the parameter determining means comprises:

displacement distance setting means for presetting a displacement distance between left and right image data of a predetermined object point of the object, which appears when the image data are rendered in the 2D rendering space;

displacement computing means for computing a position of a displaced point separated from coordinates of the object point in the 2D rendering space by the displacement distance in a base line length direction of an observer;

coordinate transformation means for computing coordinates of the displaced point in a 3D space; and base line length determining means for determining a base line length on the basis of a distance between 3D coordinates of the displaced point and the object point.

The necessity to determine stereoscopic vision parameters becomes noticeable when 3D data having no data about stereoscopic vision parameters is to be handled. Since the initial values of stereoscopic vision parameters must be set for such data, according to still another preferred aspect of the present invention, the stereoscopic vision parameter value determined by the parameter determining means is used as an initial value regardless of the movement of the viewpoint position of the observer.

If the viewpoint condition changes, the way 3D data looks may greatly change. For this reason, recalculation of a stereoscopic vision parameter is required. According to still another preferred aspect of the present invention, the parameter determining means is restarted to recalculate a value of a stereoscopic vision parameter at an arbitrary time point.

The above object point (e.g., a point on a virtual object which is nearest to the observer) must be specified in the 2D rendering space. For this reason, according to still another preferred aspect of the present invention, the object point is regarded as a point that satisfies a predetermined condition, and a plurality of search positions in the rendering space are set to have a discrete distribution to quickly search for the object point in the rendering space.

In addition, according to still another preferred aspect of the present invention, the stereoscopic vision parameter includes at least one of a base line length and convergence angle.

An optimal value of a stereoscopic vision parameter is set because the viewpoint position moves. According to still another preferred aspect of the present invention, therefore, the moving means comprises a sensor for detecting a moving amount of an actual viewpoint position of the observer. This arrangement is suited for walkthrough in a mixed reality space.

According to still another preferred aspect of the present invention, the moving means comprises a sensor for detecting a moving amount of a virtual viewpoint position of the observer. This arrangement is suited for walkthrough in a virtual space using a mouse or the like.

When the moving amount of the viewpoint position of the observer exceeds a predetermined value, recalculation of a stereoscopic vision parameter is often required. According to still another preferred aspect of the present invention, therefore, the parameter determining means is restarted to recalculate a corresponding value of a stereoscopic vision parameter.

The timing of recalculation of a stereoscopic vision parameter should not always be automatically set, but may be set in response to a request from the user. According to still another preferred aspect of the present invention, therefore, the parameter determining means is restarted in response to a request from the observer to recalculate a corresponding value of a stereoscopic vision parameter at the viewpoint position of the observer.

It is an object of the present invention to automatically set an optimal value of a stereoscopic vision parameter. However, this value may be set by the user himself/herself. According to still another preferred aspect of the present invention, therefore, the apparatus further comprises user interface means for manually setting a value of a stereoscopic vision parameter.

In the above apparatus, the mode of automatically setting a stereoscopic vision parameter value may conflict with the mode of allowing the user to set a stereoscopic vision parameter value. According to still another preferred aspect of the present invention, therefore, the apparatus further comprises means for arbitrating between the user interface means and the stereoscopic vision parameter setting means. In the embodiment described later, an icon for designating one of the modes is displayed on the display screen.

According to still another preferred aspect of the present invention, when a convergence angle is to be set as a stereoscopic vision parameter, the parameter determining means obtains a spread of an input virtual space in a depth direction, and determines a vergence angle on the basis of a direction of a substantially a midpoint position in the spread in the virtual space in the depth direction which is viewed from left and right viewpoint positions of the observer.

According to still another preferred aspect of the present invention, the predetermined object point is set at a nearest point on the object which is substantially nearest to the viewpoint position of the observer in a depth direction of a 3D space or a virtual sapce.

According to still another preferred aspect of the present invention, the displacement distance is determined in advance on the basis of a pixel size of a display apparatus on which a stereoscopic image is displayed and a distance from a display screen of the display apparatus to the observer. The parameter that matches the maximum value of the displacement distance determined by these factors, e.g., base line length, guarantees three-dimensional vision.

The displacement distance varies depending on the display apparatuses and the distances from the observer to the screens. According to still another preferred aspect of the present invention, therefore, the apparatus comprises a memory for storing predetermined displacement distance values in advance in accordance with combinations of a plurality of types of display apparatuses that can be connected to the stereoscopic image processing apparatus and distances from display screens to the observer, and means for detecting a distance from the display screen to the observer, and the parameter setting means reads out a displacement distance value matching a distance from the connected display apparatus to the observer from the memory.

When the visual axes are parallel at the left and right viewpoint positions, the nearest point on an object in a virtual space exhibits a maximum disparity distance. According to still another preferred aspect of the present invention, therefore, the nearest point is determined to be a pixel having a minimum depth value which is selected from image data obtained by perspective transformation of 3D space data from a viewpoint of the observer's left- or right-eye.

According to still another preferred aspect of the present invention, the displacement computing means comprises:

means for performing perspective transformation of 3D space data from one of the left- and right-eye viewpoints;

nearest point determining means for determining, as the nearest point, a pixel, of the image data subjected to perspective transformation by the means, which has a minimum depth value;

means for computing a position of a displaced point, in the 2D rendering space, which is separated from coordinates of the pixel having the minimum depth value by the displacement distance in the base line length direction of the observer; and means for obtaining coordinates of the displaced point in a 3D space by inverse perspective transformation of image at a position of the displaced point in the 2D rendering space from another viewpoint.

A general-purpose workstation or personal computer has a real or virtual z buffer (or depth buffer) in a 3D image processing apparatus. Depth value is held in such a buffer in rendering a 3D image. According to still another preferred aspect of the present invention, therefore, the apparatus further comprises a z buffer memory for storing a depth value to allow the use of the depth value stored in the buffer memory. This makes it possible to reduce the system resources and calculation load.

According to still another preferred aspect of the present invention, a distribution pattern of a plurality of search points in the 2D rendering space is set with a density of search points increasing toward a center so as to search for the nearest point in the 2D rendering space. This is because the observer often sees a central portion, and it suffices if stereoscopic vision is ensured in an area where the observer is gazing.

The nearest point varies in accordance with the distribution of recesses/projections of an object in a virtual space. According to still another preferred aspect of the present invention, therefore, a plurality of distribution patterns of a plurality of search points in the 2D rendering space are set to search for the nearest point in the 2D rendering space, and the apparatus detects a viewpoint position/posture of the observer and selects a distribution pattern that matches the position/posture.

Furthermore, in order to achieve the above objects, according to the present invention, there is provided a stereoscopic vision parameter setting apparatus for determining a stereoscopic vision parameter for stereoscopically displaying an arbitrary object, characterized by comprising parameter determining means for determining a stereoscopic vision parameter on the basis of 3D space data to be displayed and displacement information representing a displacement distance between the left- and right-eye images in a 2D rendering space, wherein the determined stereoscopic vision parameter is stored or output outside to be used for stereoscopic vision afterward.

Preferably, this stereoscopic vision parameter setting apparatus further comprises:

a memory for storing a determined value of a stereoscopic vision parameter; and means for updating the value of the stereoscopic vision parameter and storing the update result in the memory.

The above objects of the present invention can also be achieved by a stereoscopic image display apparatus comprising the stereoscopic image processing apparatus described above.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 26A to E are views for explaining the principle of determining base line length in the presence of vergence angle;

DETAILED DESCRIPTION OF THE PREFERRED EMBODIMENTS

Preferred embodiments of the present invention will now be described in detail in accordance with the accompanying drawings.

An embodiment will be described below, in which the present invention is applied to a walkthrough experience system for providing a user with walkthrough experience by using a rear-cross lenticular 3D display developed by the present applicant as a stereoscopic display apparatus. As will be obvious from the description given later, the present invention is not limited to only the rear-cross lenticular 3D display and walkthrough experience system.

Walkthrough System

Figure 1:
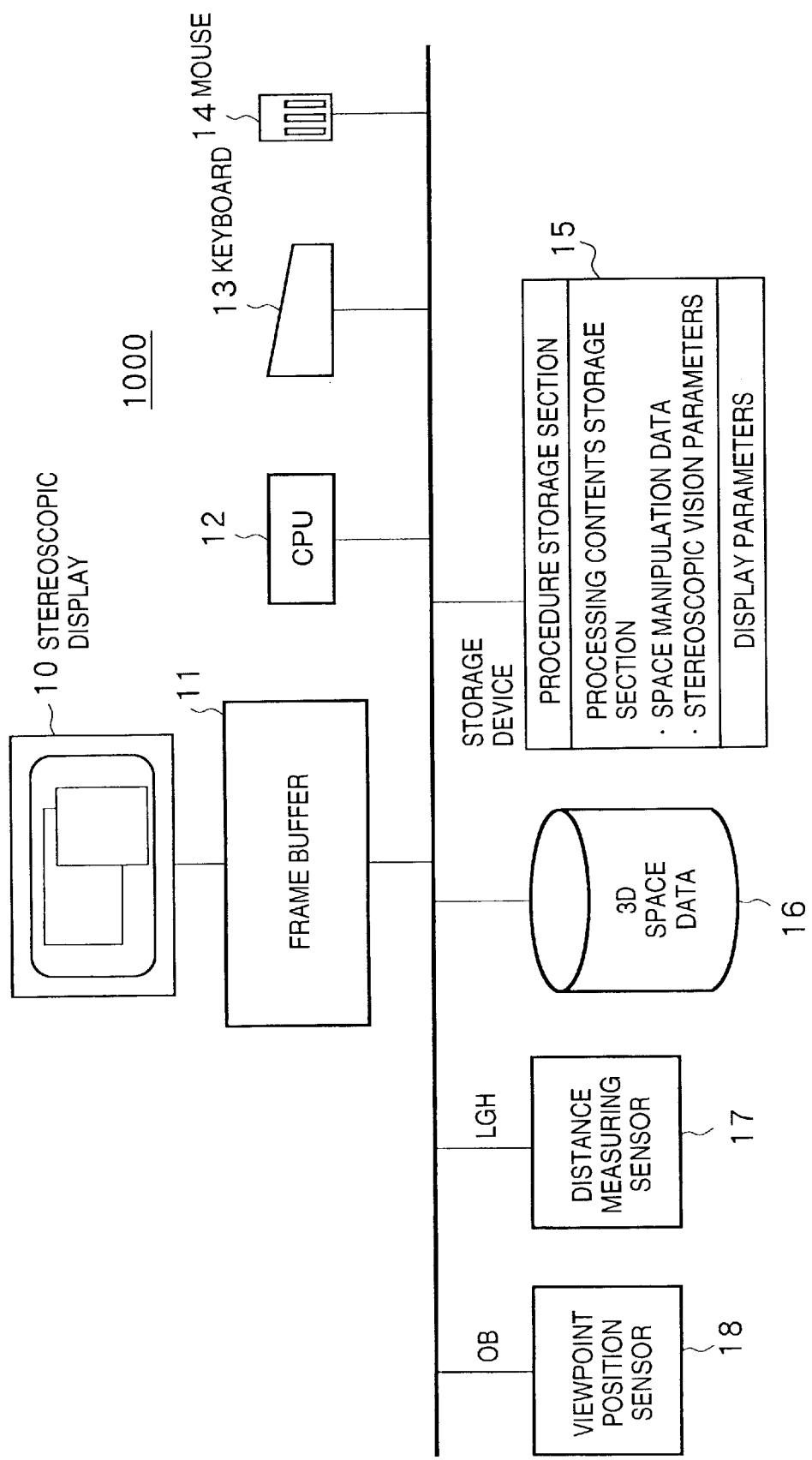
FIG. 1 is a block diagram showing the arrangement of a stereoscopic image display apparatus according to an embodiment of the present invention.

FIG. 1 shows the arrangement of a stereoscopic image display apparatus applied to this walkthrough system. Like a general workstation, a display apparatus 1000 includes a display 10, a frame buffer 11 for temporarily storing data to be displayed on the display 10 and also storing rendering image data (mask information and distance information as well), a CPU 12, a keyboard 13, a mouse 14, a memory 15 storing programs and the like, a memory 16 storing 3D space data, a distance measuring sensor 17 for measuring a distance LGH from the display 10 to the user (observer), and a viewpoint position sensor 18 for detecting viewpoint position/posture OB of the observer. Note that if the position and viewpoint of the observer are permitted to move only within a predetermined range, neither distance measuring sensor nor viewpoint position sensor is required.

To ensure stereoscopic vision, a rear-cross lenticular 3D display without glasses (i.e., naked eye) is used as the display 10.

Figure 2:
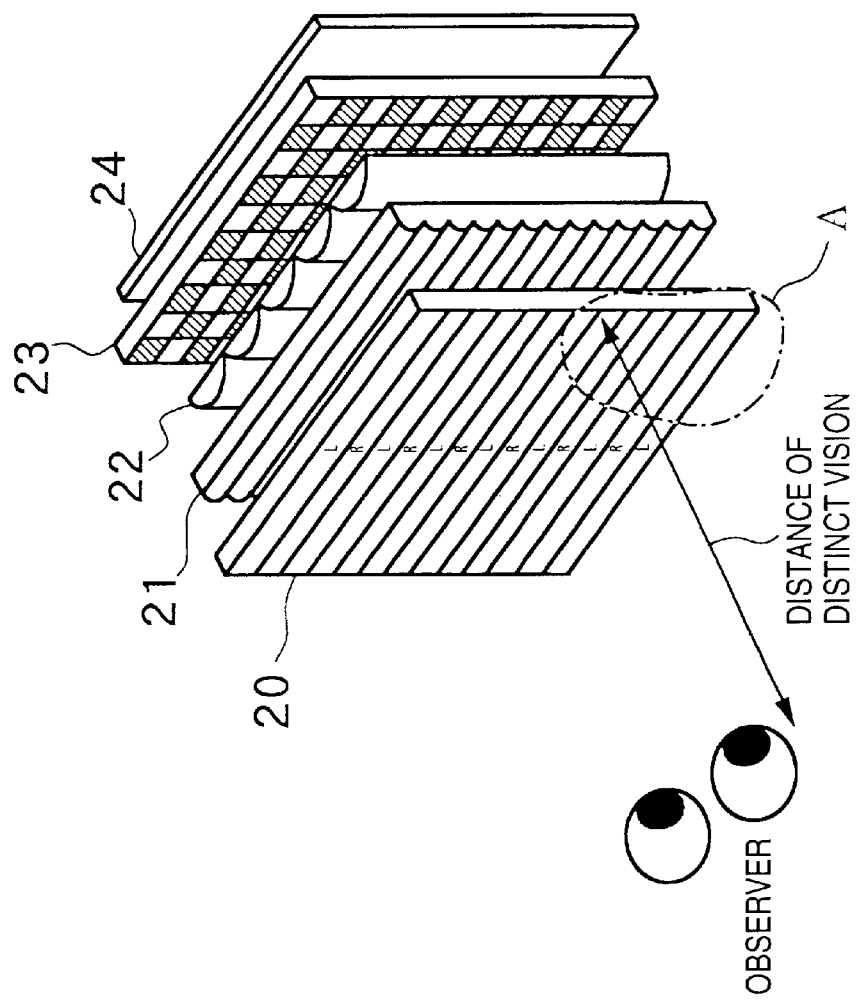
FIG. 2 is a perspective view for explaining the arrangement of a rear-cross lenticular 3D display 10 without glasses which is used for the display apparatus 1000.

The rear-cross lenticular naked-eye 3D display 10 is characterized in that two lenticular lenses (H lenticular lens 21 and V lenticular lens 22) and checkered mask panel 23 are arranged between a TFT liquid crystal (LC) panel 20 and backlight panel 24, as shown in FIG. 2. The V lenticular lens 22 separates illumination light from the backlight panel 24 into light in the left-eye direction and light in the right-eye direction by changing the directivity of the light in units of scanning lines. The H lenticular lens 21 converges light from openings in one horizontal line of the checkered mask panel 23 onto one scanning line of the LC panel 20 to prevent crosstalk, and also converts light from an opening portion into a light beam diverging toward the observer to enlarge the stereoscopic vision range.

Figure 3:
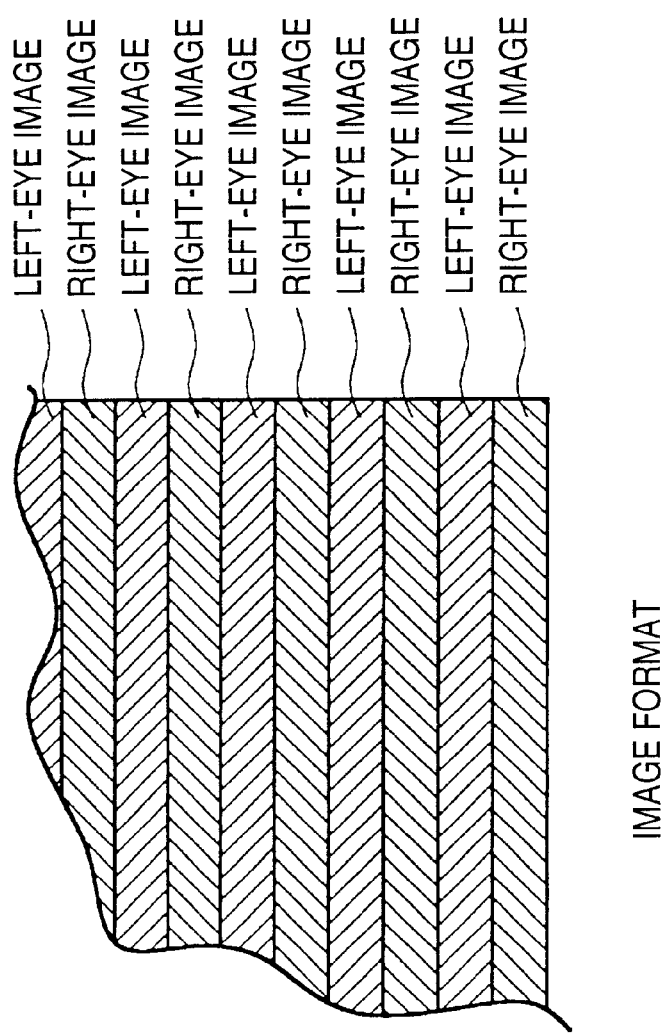
FIG. 3 is an enlarged view of an LCD portion of the display 10.

FIG. 3 is an enlarged view of a partial area A of the LC panel 20 in FIG. 2. As shown in FIG. 3, in this display 10, the image synthesized by alternately arranging left and right stereoscopic images for stereoscopic vision in the form of horizontal stripes is displayed on the LC panel 20. As compared with a general lenticular scheme of inputting vertical stripe images, for example, the above scheme is free from color separation corresponding to vertical stripes of liquid crystals and is compatible with horizontal stripe synthetic images of a time-division field sequential scheme used as a standard scheme for liquid crystal shutter glasses and the like.

A stereoscopic image of a virtual space where the user should walk through is displayed on the display 10. The user who experiences walkthrough designates a traveling direction and moving distance with the mouse 14 or keyboard 13. The CPU 12 generates a virtual image at the moving destination in accordance with a predetermined walkthrough application program stored in the memory 15, and displays the virtual image on the display 10, thereby allowing the user to experience a virtual space.

Figure 4:
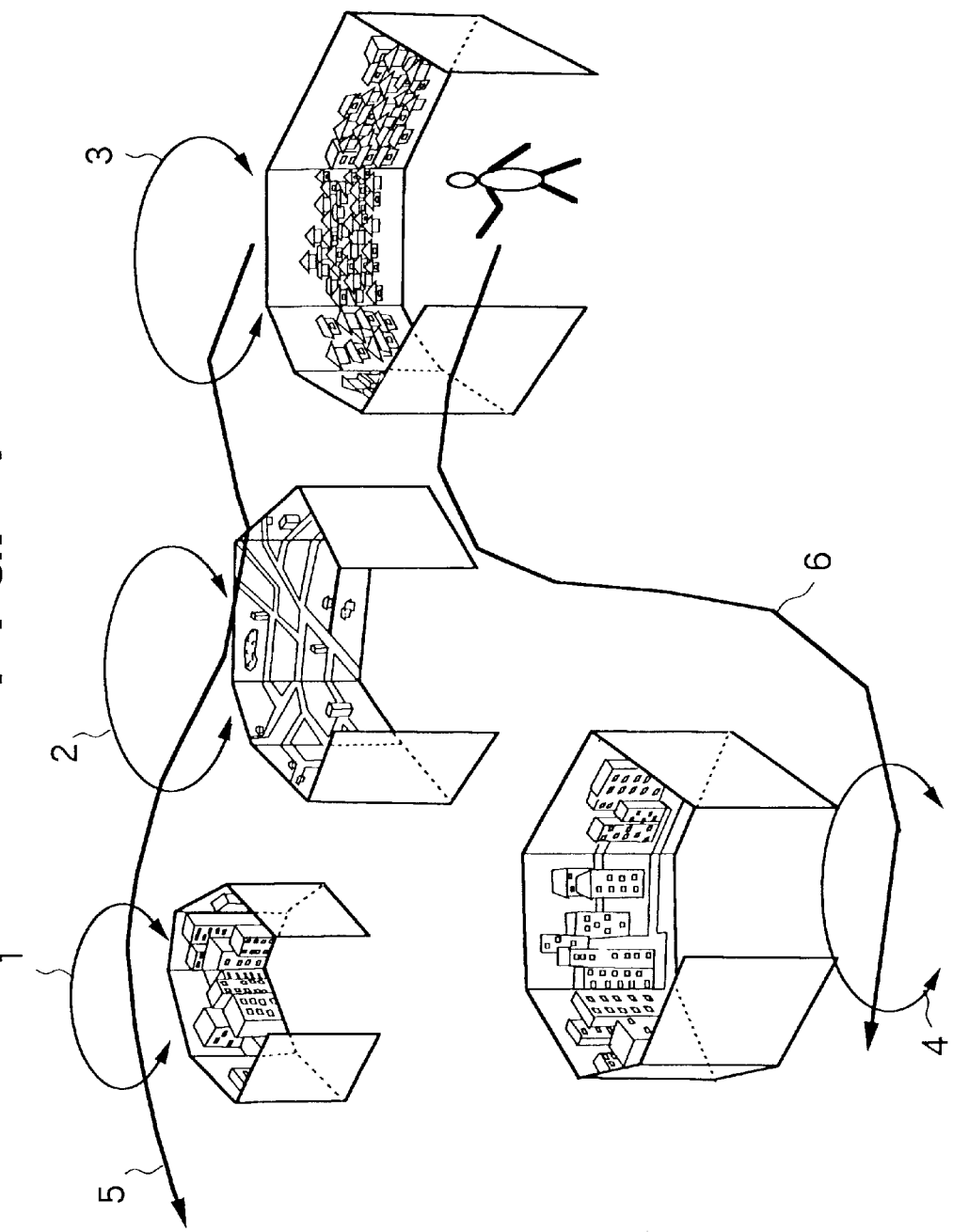
FIG. 4 is a perspective view for explaining a case wherein the function of setting stereoscopic vision parameters in this embodiment is applied to a virtual space walkthrough system.

Assume that four narrow areas 1, 2, 3, and 4 are set in this walkthrough space, as shown in FIG. 4. When the user is to walk through different narrow areas, he/she can designate a moving route 5 or 6 with the mouse. The 3D space data of the respective narrow areas in this walkthrough space are stored in the memory 16. This system, i.e., the application program, therefore, sets the initial values of stereoscopic vision parameters in the following manner if no stereoscopic vision parameters are set in the 3D space data of the respective narrow areas which are stored in the memory 16. If, for example, the user is to move to another narrow area (space), the viewpoint conditions (viewpoint position and visual axis direction) greatly change. For this reason, the stereoscopic vision parameters must be changed at this time point to match the viewpoint conditions (viewpoint position and visual axis direction) in the narrow space at the moving destination.

As described above, the system of this embodiment can dynamically (without the mediacy of the user or in accordance with an instruction from the user, as needed) set dynamic optimal values of stereoscopic vision parameters as well as their initial values.

Principle of Determining Optimal Base Line Value

Figure 5:
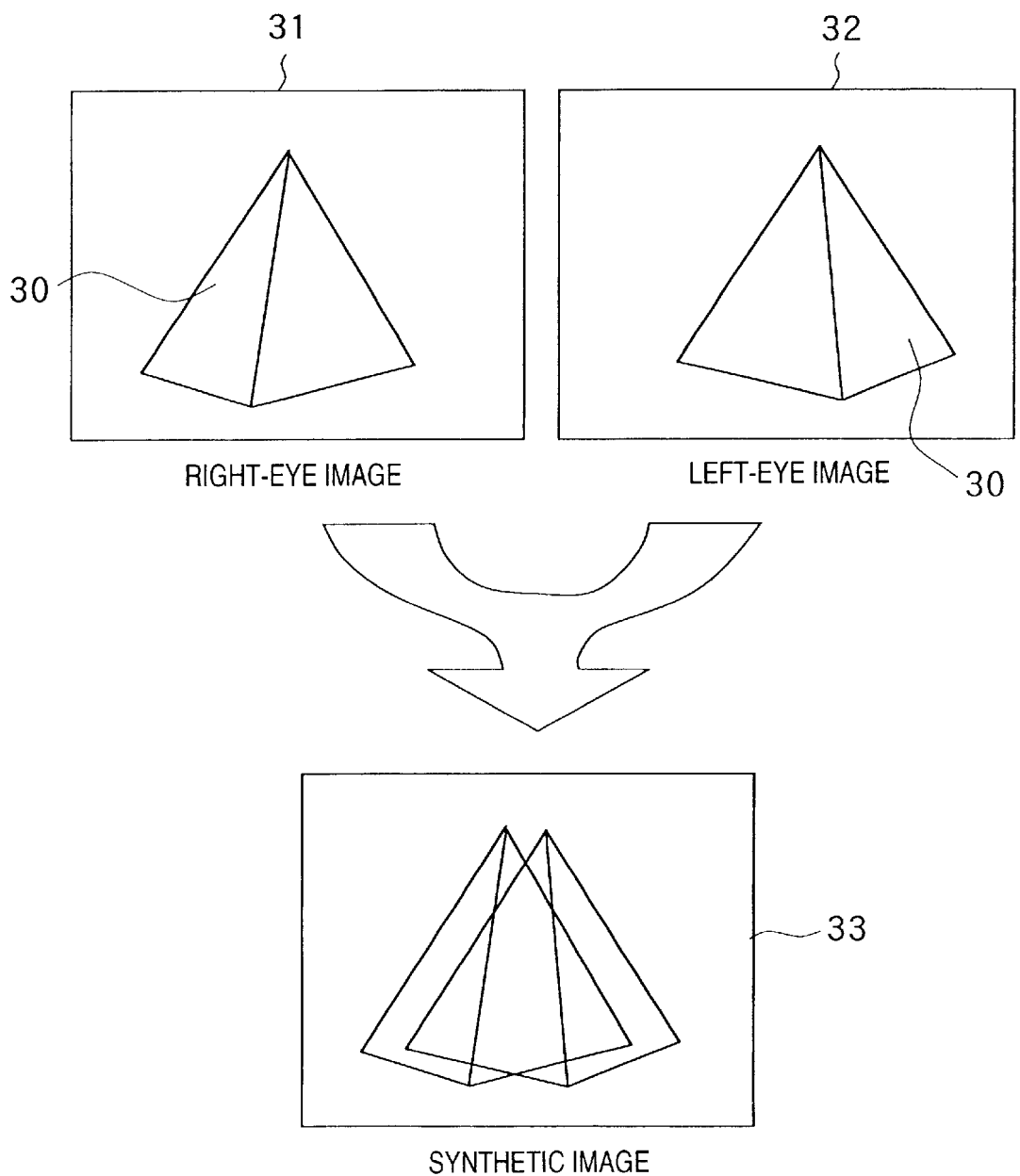
FIG. 5 is a view for explaining the principle of synthesizing left- and right-eye images to obtain stereoscopic vision.
Figure 6:
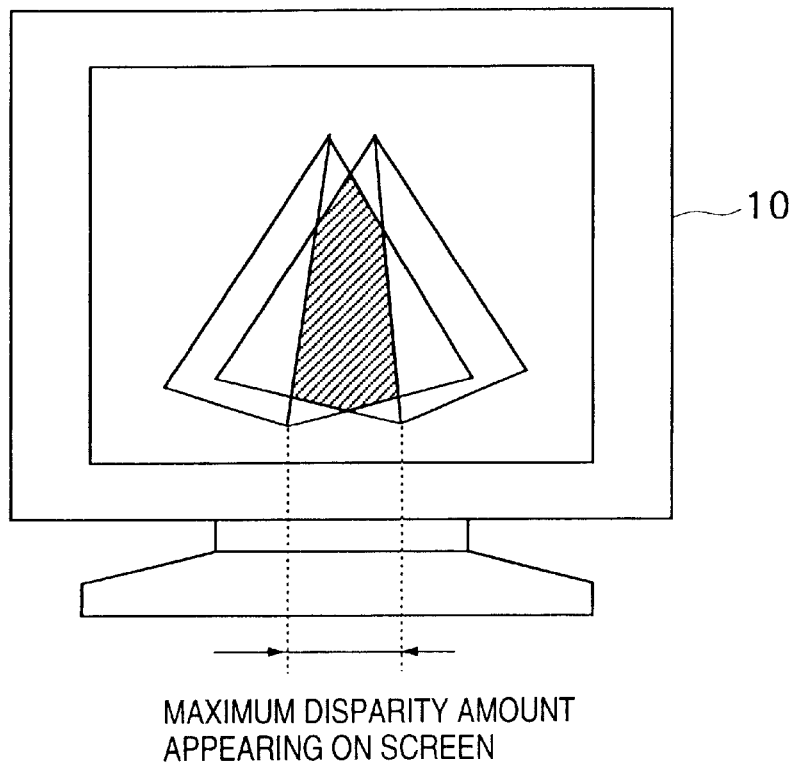
FIG. 6 is a view for explaining the relationship between the maximum disparity amount and base line length.

FIG. 5 shows a result of perspective transformation of a 3D space data. Due to the difference between viewpoint conditions of left- and right-eyes, two different images (a right-eye image 31 and left-eye image 32) are generated and stored. If appropriate base line length and vergence angle are set, the two images 31 and 32 have an apparent displacement on the display 10 as indicated by "33" in FIG. 5 and are displayed on the display 10, as shown in FIG. 6. If this displacement amount is appropriately set, the user perceives the images 31 and 32 as a merged stereoscopic image.

In determining an optimal base line length in this system, when the stereoscopic images 31 and 32 are displayed as shown in FIG. 6, the maximum disparity value (to be referred to as the maximum disparity amount hereinafter) between the images 31 and 32 appearing on the screen matters. In this case, disparity basically indicates the maximum value of the distances between points on the images 31 and 32 rendered/displayed in a 2D space, which correspond to one point (on the virtual object or actual object).

It is known well whether the user can stereoscopically perceive the displayed object images 31 and 32 is closely associated with the above disparity amount in addition to conditions such as the size and characteristics (e.g., pixel pitch) of the display 10 and the distance from the viewpoint of the user to the screen. In the system of this embodiment, this maximum disparity amount is adjusted for each display;

to be equal to or less than a predetermined amount;

automatically.

The principle of determining base line length in this embodiment will be described with reference to FIGS. 7 to 10.

Figure 7:
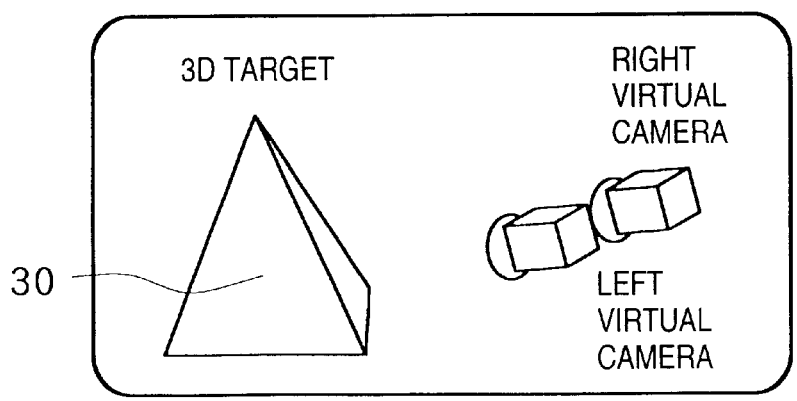
FIG. 7 is a view for explaining the manner of generating two left and right images so as to explain the principle of determining base line length.
Figure 8:
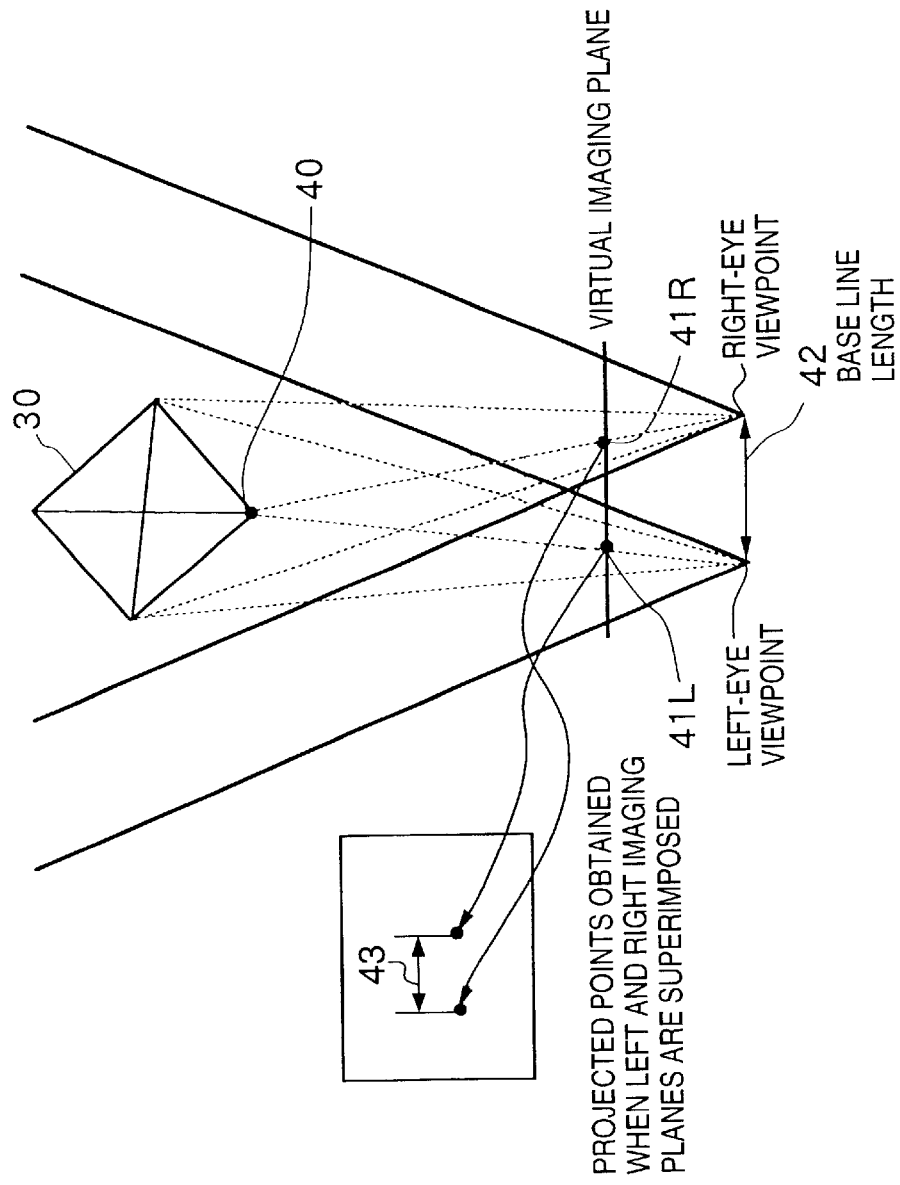
FIG. 8 is a view for explaining how the nearest point in a virtual space is produced as disparity between two viewpoints.

For the sake of simplicity, a quadrangular pyramid 30 is assumed as an object. The 3D space data of the object 30 which is stored in the memory 16 is the data from which a stereoscopic image like the one shown in FIG. 6 can be obtained when this quadrangular pyramid 30 is photographed by left and right virtual cameras positioned as shown in FIG. 7. FIG. 8 shows the relationship between the object 30 and the viewpoints of the left and right virtual cameras when this imaging operation of the virtual cameras is viewed from above. Referring to FIG. 8, a virtual imaging plane is the imaging plane of each virtual camera, its resolution matches that of the display 10, and 1-pixel image data obtained by each virtual camera is displayed on one pixel of the display screen of the display 10. Without consideration of scale, therefore, the position on a virtual imaging plane is equivalent to the display position on the display.

Referring to FIG. 8, a vertex 40 of the quadrangular pyramid 30 is projected on a point 41R on the imaging plane (i.e., display screen) of the right virtual camera and on a point 41L on the imaging plane (i.e., display screen) of the left virtual camera. That is, if the distance (i.e., base line length) between the viewpoint positions of the left and right virtual cameras is set to a distance 42, the 3D position of the point 40 on the object 30, the base line length 42, and a distance 42 between the projected points 41L and 41R are in a one-to-one correspondence with each other.

As described with reference to FIG. 6, if a target (the object 30 in this case) does not change (does not deform or move), the change amount of base line length greatly influences the maximum disparity amount on a virtual image at an arbitrary point of the object. When the visual axis directions of the two virtual cameras are parallel as in the case shown in FIG. 8, in particular, the maximum disparity amount is governed by only a change in base line length. In this case, since the maximum disparity amount linearly changes with a change in base line length, in order to ensure stereoscopic vision (i.e., to set the maximum disparity amount to a predetermined value or less), the base line length as a stereoscopic vision parameter may be adjusted.

If the visual axes of the virtual cameras are parallel as shown in FIG. 7, the disparity amount at the point on the object which is nearest to the viewpoint becomes maximum. Stereoscopic vision at all points on the object (the quadrangular pyramid 30 in the case shown in FIG. 7) is ensured by calculating the disparity amount at the point on the object which is nearest to the viewpoint and calculating base line length on the basis of the disparity amount.

This walkthrough stereoscopic vision system therefore incorporates the following two processes:

the process of determining one of points on an object which is nearest to the virtual camera viewpoint (or assumed to be nearest to the viewpoint) (to be referred to as the nearest point hereinafter) (this process will be referred to as the "nearest point determining process"); and the process of determining base line length on the basis of the displacement amount at this nearest point on the imaging plane (this process will be referred to as the "base line length determining process").

Principle of Base Line Length Determining Process

The principle of determining base line length on the basis of the nearest point in a case wherein the nearest point has already been determined will be described first with reference to FIGS. 9 and 10.

Figure 9:
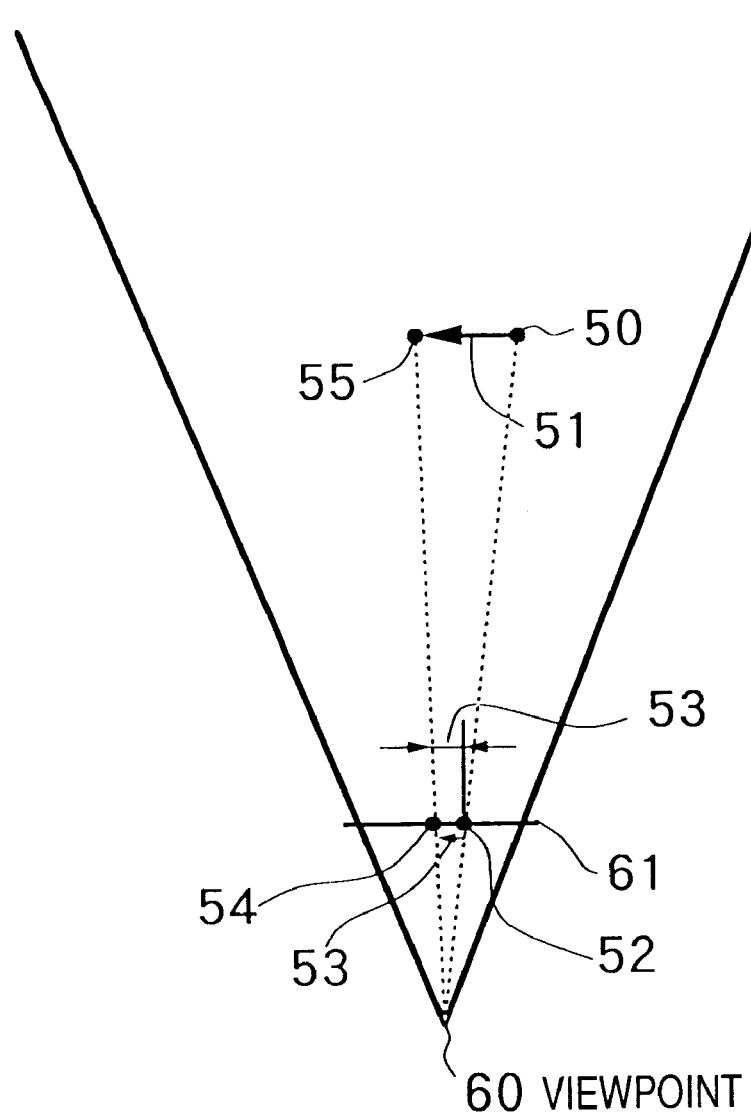
FIG. 9 is a view for explaining the principle of determining base line length in this embodiment.
Figure 10:
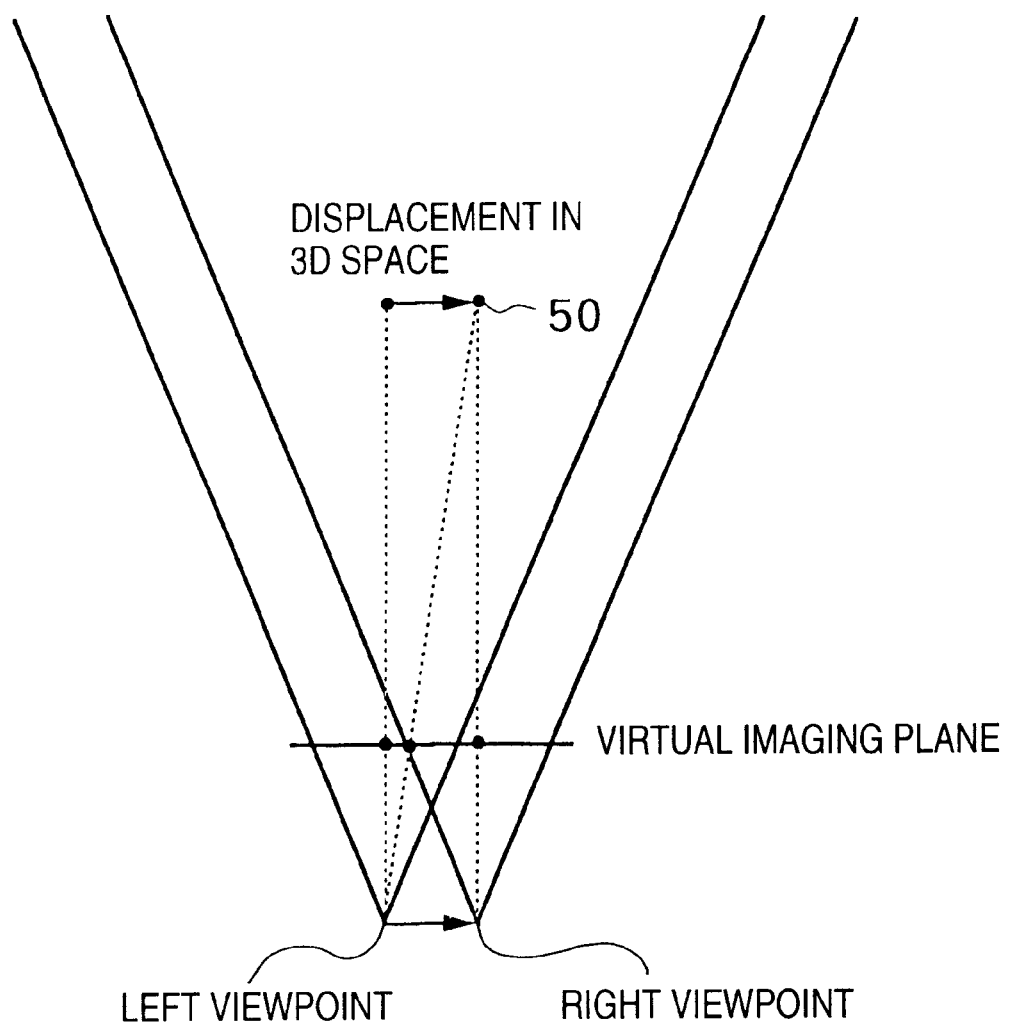
FIG. 10 is a view for explaining the principle of determining base line length in this embodiment.

Referring to FIG. 9, a viewpoint 60 is, for example, a viewpoint at the right virtual camera (or left virtual camera) in FIG. 7, and a virtual imaging plane 61 is the imaging plane of the virtual camera. The resolution of the virtual imaging plane 61 matches the resolution of the display 10. That is, 1-pixel image data obtained by the virtual camera is displayed on one pixel on the display screen of the display 10.

Referring to FIG. 9, assuming that the length of a virtual line 53 is set to a length corresponding to the maximum disparity amount required to ensure a stereoscopic image displayed on the display 10 as stereoscopic vision, when the virtual line 53 is set at the position shown in FIG. 9 on the virtual frame, a right end point 52 should be a projection of a nearest point 50 on the 3D object. In this case, if the right end point 52 is set as a projection of the nearest point 50, and the length of the virtual line 53 is set to the length corresponding to the maximum disparity amount required to ensure stereoscopic vision, a left end point 54 of the virtual line 53 should be a projected point of the same nearest point 50 on the virtual imaging plane of the left virtual camera. When, therefore, the left end point 54 of the virtual line 53 is projected onto a 3D space by taking an inverse perspective view using the right virtual camera instead of the left virtual camera, a point 55 can be obtained. That is, a line segment 51 connecting the points 50 and 55 in the 3D space represents projection of the virtual line 53 (i.e., the maximum disparity amount) on the virtual imaging plane onto the 3D space. Letting $V_R$ be a perspective transformation matrix obtained by the right virtual camera, the projected point 55 of the point 54 is given by an inverse matrix $V_R^{-1}$.

Since the length of the virtual line 53 is set to correspond to the maximum disparity amount required to ensure stereoscopic vision, if the distance (i.e., baseline length) between the left and right virtual cameras is set to the length of the virtual line 53, the observer can see a merged image of the nearest point 50. The virtual cameras are set to have parallel visual axes, and the length of the virtual line 53 is set to correspond to the maximum disparity amount. This allows the observer to see all points on the object as well as the nearest point 50, i.e., stereoscopically see the object.

The base line length determining process in the system of this embodiment is nothing but the process of determining the length of the line segment 51.

Nearest Point Determining Process

The base line length determining process should be performed on the condition that the nearest point is determined in advance. The nearest point may be manually selected by the observer or user with a mouse or the like while watching the screen of the display 10. However, real-time walk-through operation cannot be performed. The system of this embodiment, therefore, automatically obtains and determines the nearest point in place of the user.

In the system of this embodiment, 3D space data stored in the memory 16 includes, for example:

- data describing a shape (3D position data (X, Y, Z) about a group of points and patch links between the points);
- data describing the characteristics (color, reflectance, transmittance, and texture) of a surface; and
- data describing the position of a light source. In addition to these data, general 3D space data can include data describing initial values, several sets of viewpoint positions and directions, a method of operating an object that is dynamically moving, and a method of generating a sound (e.g., generating a sound when a given object is touched), data describing a script language that allows execution of procedures, and the like. A detailed description of these data, except for the data about viewpoint positions and directions, will be omitted because they are not directly relevant to the present invention.

The nearest point changes depending on the 3D position data (X, Y, Z) about a group of points and the viewpoint position of the user (i.e., the virtual cameras). The nearest point must therefore be determined in consideration of the viewpoint position of the user.

The distance from the viewpoint position of the user to an object can be obtained by using a "z buffer value" used in the technical field of computer graphics. A z buffer and z buffer value will be briefly described first.

Figure 11:
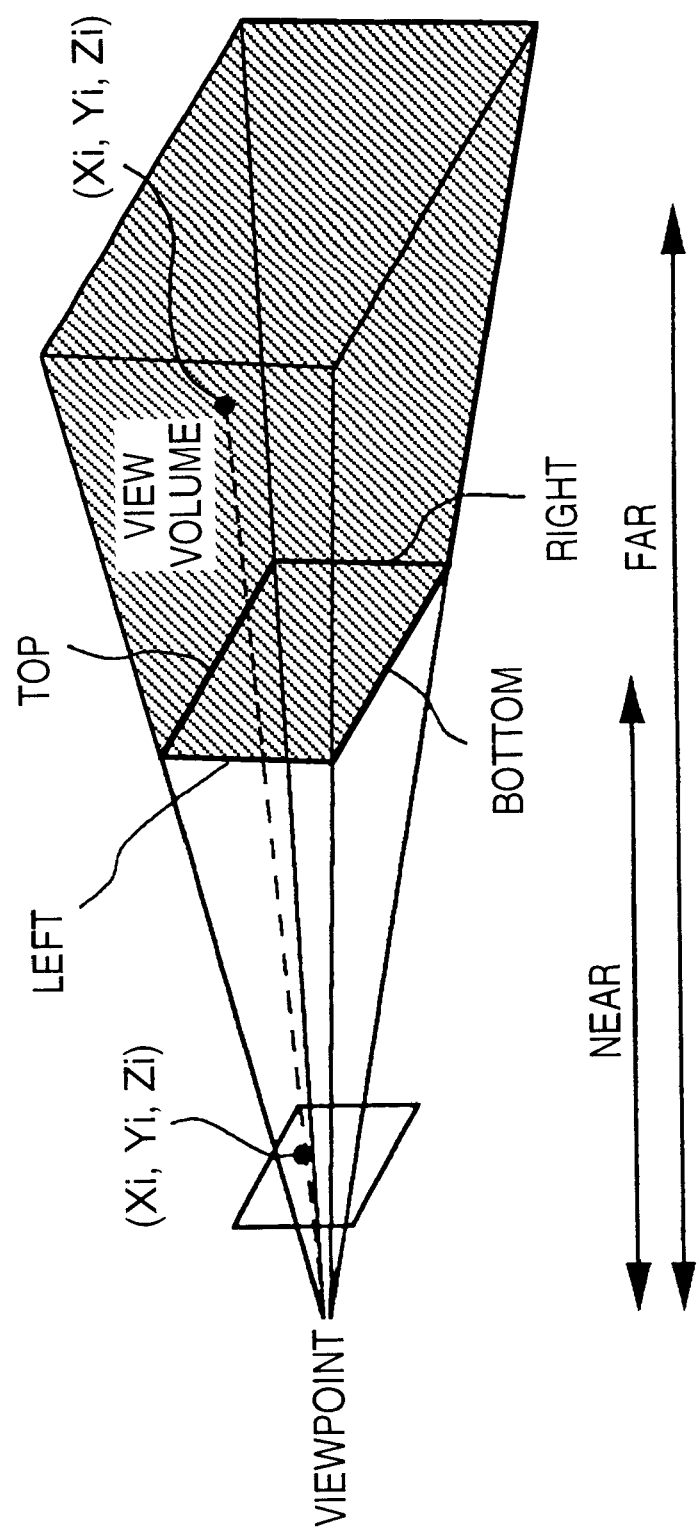
FIG. 11 is a perspective view for explaining perspective transformation.

A point $(X_i, Y_i, Z_i)$ in a 3D space must be subject to perspective transformation to a 2D plane for display. If the viewpoint position of the user and an apparent volume are assumed as shown in FIG. 11, and the apparent volume is defined as b=bottom, t=top, l=left, r=right, n=near, and f=far, the point $(X_i, Y_i, Z_i)$ in the 3D space is transformed into $(x_i, y_i, z_i)$ on the imaging plane of the virtual camera as follows. In this case, the following transformations use coordinate systems of the same degree.

$$\begin{bmatrix} x'_i \\ y'_i \\ z'_i \\ w \end{bmatrix} = V_R \begin{bmatrix} X_i \\ Y_i \\ Z_i \\ 1 \end{bmatrix} \quad (1)$$

$$V_R = \begin{bmatrix} \frac{2n}{r-l} & 0 & \frac{r+l}{r-l} & 0 \\ 0 & \frac{2n}{r-b} & \frac{t+l}{t-l} & 0 \\ 0 & 0 & \frac{-(f+n)}{f-n} & \frac{-2f \cdot n}{f-n} \\ 0 & 0 & -1 & 0 \end{bmatrix} \quad (2)$$

$$(x_i, y_i, z_i) = \left( \frac{x'_i}{w}, \frac{y'_i}{w}, \frac{z'_i}{w} \right) \quad (3)$$

Of $(x_i, y_i, z_i)$ obtained by the above perspective transformation, $(x_i, y_i)$ represents a 2D position on the virtual imaging plane, and $z_i$ represents a z buffer value. This z buffer value is the value obtained by normalizing the viewing volume in the depth direction while maintaining the object depth ordering in the 3D space before perspective transformation. In general, in the technical field of computer graphics, occlusion of a surface and line is determined (deletion of invisible surface or line) when an image is to be displayed by using this z buffer value. This operation is implemented by using a frame buffer memory called a z buffer in addition to an RGB color buffer memory required for the display screen (virtual imaging plane). In this process, upon obtaining $(x_i, y_i, z_i)$ by perspective transformation, a color calculation result and name are stored in the RGB color buffer and z buffer at the pixel position corresponding to $(x_i, y_i)$; and if the value of the pixel is smaller than the value that has already been stored in the z buffer, the value is not updated.

Originally, the z buffer and the result $z_i$ obtained by equations (1) to (3) are used for this process. In this case, the z buffer may be prepared as a hardware memory exclusively prepared for this purpose or implemented by means of software by being allocated to a general main memory instead of a special-purpose memory.

As in this process, the z buffer holds the depth information on the nearest surface of the target object which is viewed from the user viewpoint, and also holds the object depth ordering in the 3D space before perspective transformation. The z buffer can therefore be used to obtain the nearest point from the user viewpoint. That is, a point having the minimum z buffer value is the nearest point.

In this case, to obtain the z buffer value at a position (x, y), for example, the following command can be used:

glRcadPixels(x,y,l,l,GL_DEPTH_COMPONENT, GL_FLOAT, &z)

A nearest point $(x_n, y_n, Z_n)$ is obtained by searching the frame buffer 11 for a point that satisfies $$(X_n, Y_n, Z_n) = \{X_i, Y_i, Z_i : i=\}n=\{Z_n: \min(Z_i)\} \quad (4)$$

Figure 12:
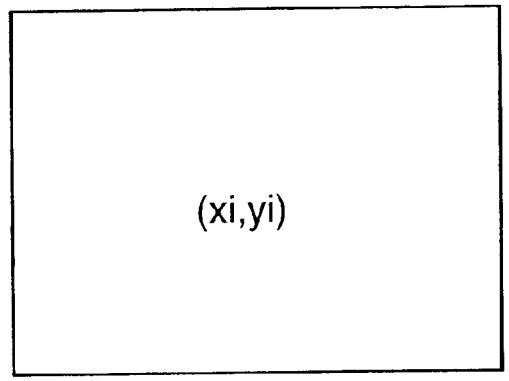
FIG. 12 is a view for explaining sampling in a 2D space.

In reading z buffer values from the frame buffer and searching the frame buffer for the nearest point by using equation (4), it takes time to read out data (especially when the hardware used is a general frame buffer). To quickly search for the nearest point, only selected pixels are used as search points (all pixels stored in the frame buffer are not used as search points). The selection of pixels for the search points is referred to as sampling of search points in the present specification. Sampling of search points is performed within the frame buffer, i.e., in the 2D space on the imaging plane, as shown in FIG. 12. More specifically, the distribution of sampling points i is set in advance as shown in one of FIGS. 13 to 18. Referring to FIGS. 13 to 18, each point represents a sampling point. That is, the sampling points preferably include the actual nearest point.

Figure 13:
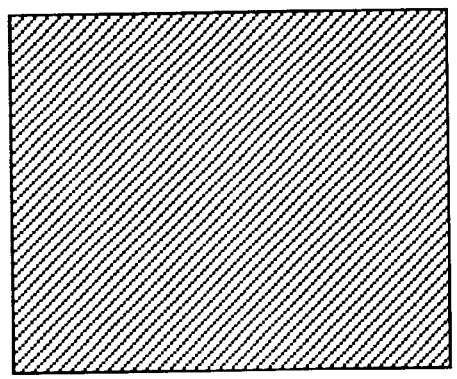
FIG. 13 is a view showing a sampling pattern for searching for the nearest point.

In the case shown in FIG. 13, sampling points are set in the entire 2D space (x, y). This technique allows a high-precision search for the nearest point but has the disadvantage of taking much time for the search.

Figure 14:
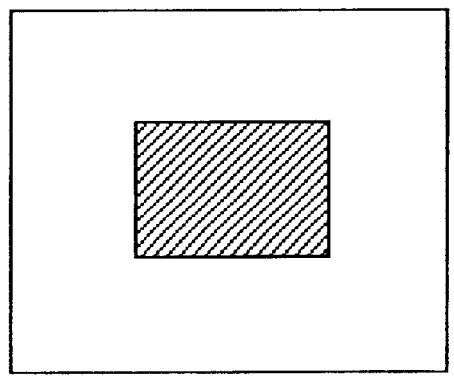
FIG. 14 is a view showing another sampling pattern for searching for the nearest point.

In the case shown in FIG. 14, only a central area on the imaging plane is sampled. The observer (user) watches the imaging space of the virtual camera, i.e., a central area of the display space of the display 10 most of the time. This means that as long as stereoscopic vision is obtained in the central area, it does not matter whether stereoscopic vision cannot be obtained in peripheral areas. Sampling points are therefore concentrated in the central area to realize high-speed processing.

Figure 15:
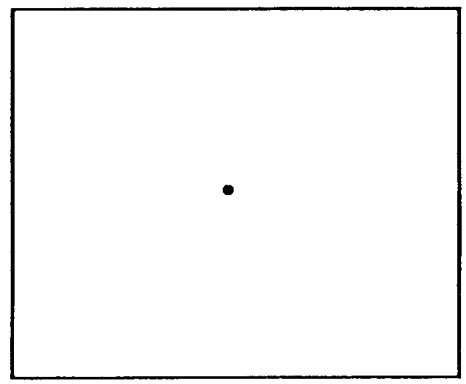
FIG. 15 is a view showing still another sampling pattern for searching for the nearest point.

In the case shown in FIG. 15, a search is focused on one point in the center. Although the processing speed can be increased to an extreme, the probability of failing to obtain stereoscopic vision increases. If, for example, a far point is mistaken for the nearest point, the observer may not perceive a display image near the actual nearest point (on the display 10) as a stereoscopic image.

Figure 16:
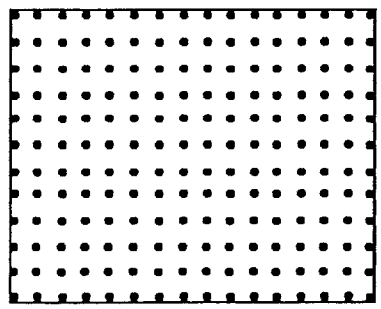
FIG. 16 is a view showing still another sampling pattern for searching for the nearest point.

In the case shown in FIG. 16, the density of sampling points is uniformly decreased as compared with the case shown in FIG. 13.

Figure 17:
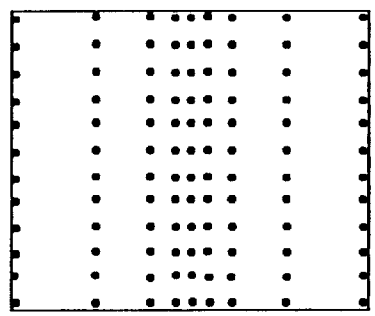
FIG. 17 is a view showing still another sampling pattern for searching for the nearest point.

FIG. 17 shows an example of a sampling pattern set such that importance is attached to the implementation of stereoscopic vision in the vertical direction on the display 10 at the expense of a deterioration in stereoscopic vision in the horizontal direction.

Figure 18:
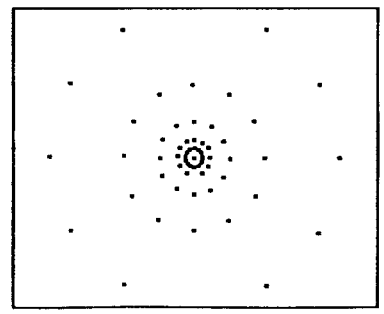
FIG. 18 is a view showing still another sampling pattern for searching for the nearest point.

FIG. 18 shows an example of a sampling pattern set at the expense of a deterioration in stereoscopic vision as sampling points radially separate from the center.

Figure 19:
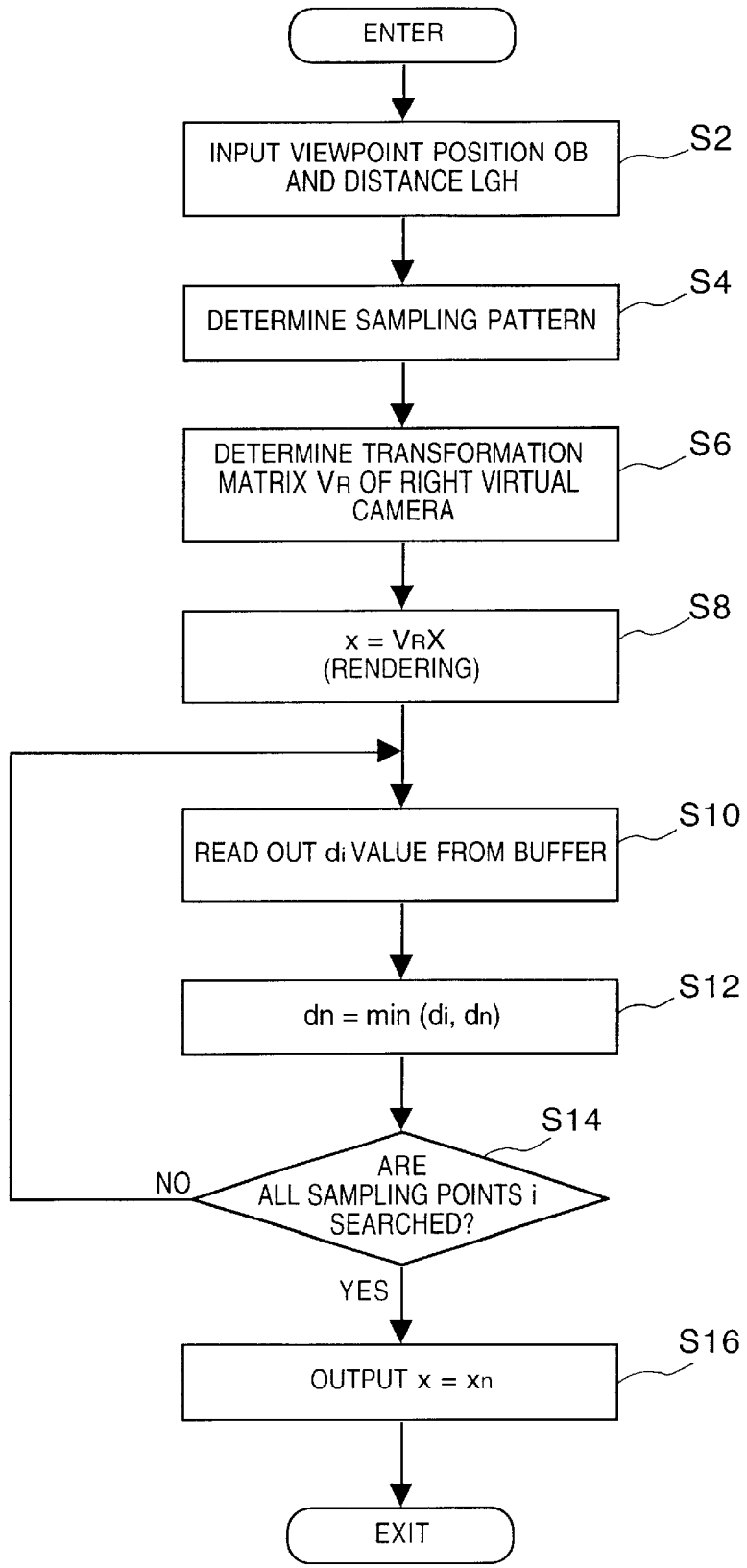
FIG. 19 is a flow chart for explaining a control procedure for determining the nearest point.

FIG. 19 shows a control procedure for determining the nearest point.

In step S2, the distance LGH between the viewpoint and the screen is input, together with the viewpoint position OB (the 3D position of the viewpoint and the rotational angle of the head portion around the three axes) of the user. In step S4, a sampling pattern suited for the viewpoint position OB of the user is determined from the patterns shown in FIGS. 13 to 18. In step S6, the viewing transformation matrix $V_R$ of the right virtual camera is determined on the basis of the viewpoint position OB and the distance LGH to the viewpoint.

In step S8, a vector X (vector X in step S8) as the 3D space data of the object is transformed into a vector x (vector x in step S8) as 2D image on the imaging plane. As described above, this vector x has a depth buffer value d.

In step S10, a depth value $d_i$ of one point $X_i$ is obtained from the buffer in accordance with the sampling pattern designated in step S4. In step S12, a minimum value $d_n$ of the depth value $d_i$ is searched out. All sampling points i are searched (step S14). The resultant nearest point $x=x_n$ is output in step S16.

If a plurality of nearest points are obtained, one of the points which is nearest to the line-of-sight direction of the user is determined on the basis of the viewpoint position information OB and used.

In determining a pattern in step S4, the system may display icons representing the distribution patterns shown in FIGS. 13 to 18 on the display 10, and the user may designate one of the icons with the keyboard 13.

According to the control in this embodiment, therefore, i: the nearest point is automatically determined without any manual operation;

ii: versatility improves because a known z buffer (or depth buffer) is used to determine the nearest point;

iii: in searching for the nearest point, a plurality of types of sampling point distribution patterns are set in advance, and an optimal one is designated by the system or the user upon selection, thereby determining the nearest point without sacrificing processing speed; and iv: in automatically designating a sampling point distribution pattern, an area in the direction of interest can be reliably visualized stereoscopically because designation is made in consideration of the line-of-sight direction of the user.

Control Procedure for Determining Stereoscopic Vision Parameters

Figure 20:
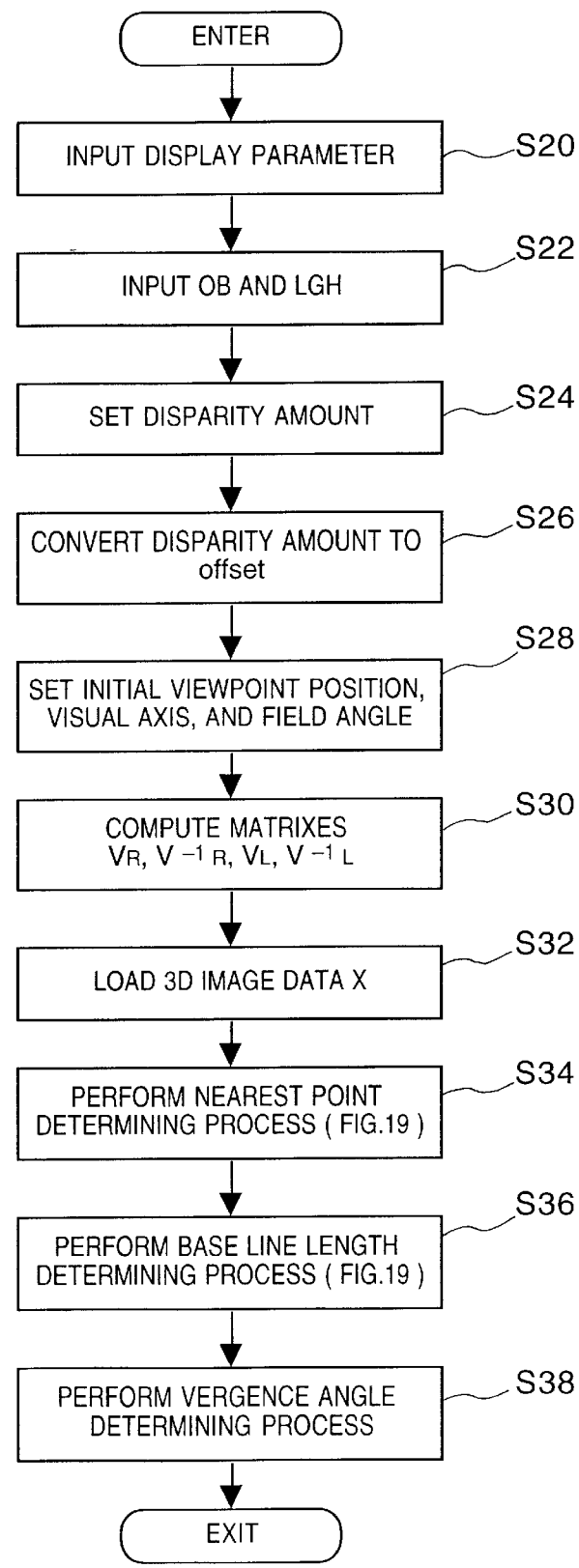
FIG. 20 is a flow chart for explaining a control procedure for setting a stereoscopic vision parameter.

FIG. 20 is a flow chart showing a control procedure for determining stereoscopic vision parameters according to this embodiment.

In step S20, various parameters for the display 10 are input. The parameters influence the maximum disparity amount required to ensure stereoscopic vision, and include, for example, the size (width×height) of one pixel and the size of one frame of the display 10. The system has already learned these pieces of hardware information.

In step S22, the position/posture OB of the user and the distance LGH from the display screen to the viewpoint of the user are input from the sensors described above.

In step S24, the maximum disparity amount required to ensure stereoscopic vision is set on the basis of the above information. The maximum disparity amount required to ensure stereoscopic vision is preferably determined in advance for each size specification of a display screen (e.g., the specifications of VGA and XVGA). In step S26, the set maximum disparity amount (e.g., a distance of 10 mm) is converted into an offset amount (offset) expressed by the number of pixels. With this operation, stereoscopic vision can be ensured by determining base line length that produces a disparity corresponding to the offset on the screen of the display 10 (see FIGS. 9 and 10).

In step S28, the initial position/posture of the user, visual axis, and field angle are set. In step S30, the perspective transformation matrixes $V_L$ and $V_R$ of the left and right cameras and inverse perspective transformation matrixes $V_L^{-1}$ and $V_R^{-1}$ are computed on the basis of the viewpoint position/posture of the user set in step S28. In step S32, the 3D space data is read out from the memory 16.

With the above processing, all the preparations for the determination of stereoscopic vision parameters are made.

In step S34, the nearest point determining process described with reference to FIG. 19 is performed. In the control procedure shown in FIG. 19, the nearest point $(x_n, Y_n, d_n)$ is output.

Figure 21:
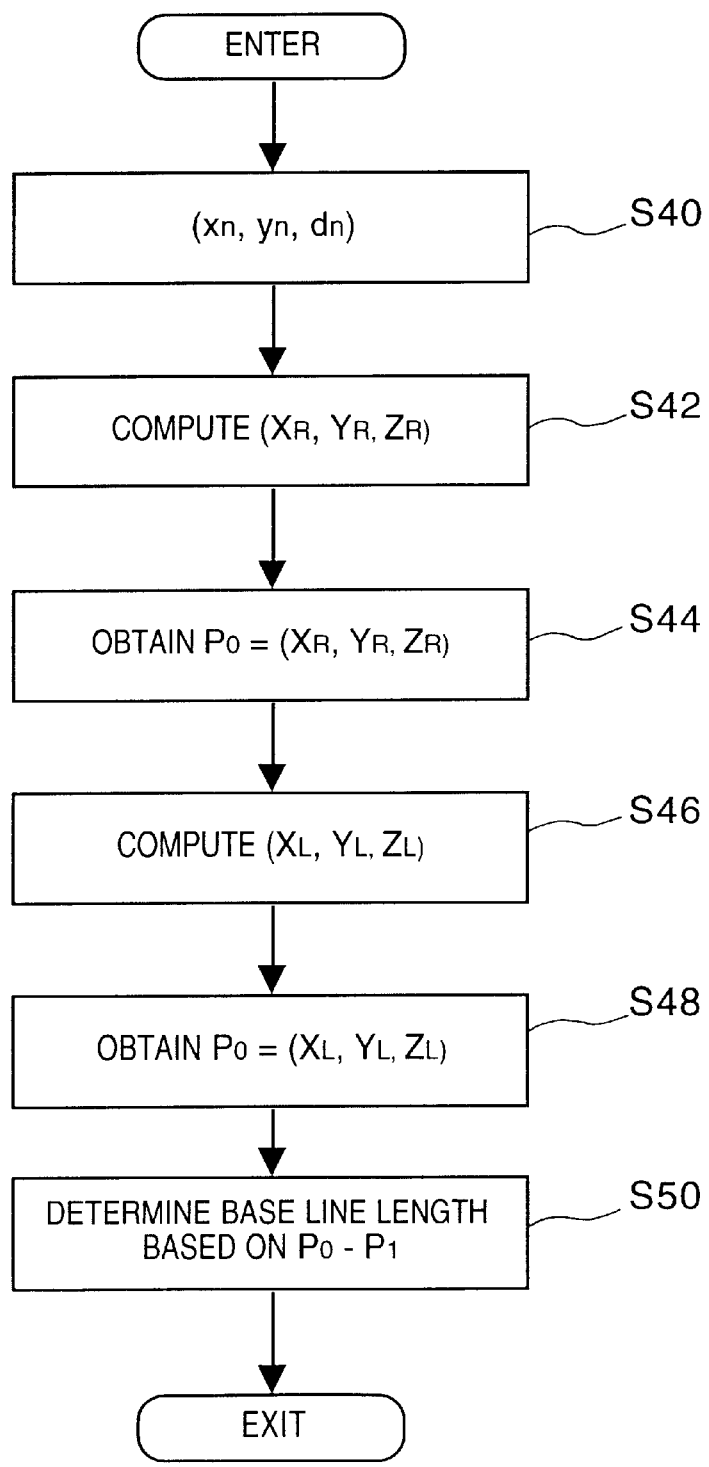
FIG. 21 is a flow chart for explaining a control procedure for setting a base line length.

The base line length determining process in step S36 in FIG. 20 is then executed. FIG. 21 shows the details of this base line length determining process.

This process will be described with reference to FIG. 21.

In step S40, the nearest point $(x_n, y_n, d_n)$ output in the nearest point determining process is stored in a predetermined register. This nearest point $(x_n, y_n, d_n)$ corresponds to the nearest point 50 in FIG. 8 which is projected as the point 52 on the virtual imaging plane. In step S42, the nearest point $(x_n, y_n, d_n)$ is normalized, and a pixel position $(x_R, y_R, z_R)$ in the space after projection transformation by the right virtual camera is calculated by:

$$(x_R, y_R, z_R) = \left(2 \cdot \left(\frac{x}{\text{width}} - 0.5\right), 2 \cdot \left(\frac{y}{\text{height}} - 0.5\right), d\right) \quad (5)$$

In step S44, a coordinate value $P_0=(X_R, Y_R, Z_R)$ of the point (point 50 in FIG. 8) in the 3D space in the camera coordinate system is obtained from the pixel position $(x_R, y_R, z_R)$. If the inverse matrix of the transformation matrix $V_R$ of the right virtual camera is given by $$V_R^{-1} = \begin{bmatrix} \frac{r+l}{2n} & 0 & 0 & \frac{r+l}{2n} \\ 0 & \frac{t-b}{2n} & 0 & \frac{t+b}{2n} \\ 0 & 0 & 0 & -1 \\ 0 & 0 & \frac{-(f-n)}{2f \cdot n} & \frac{f+n}{2f \cdot n} \end{bmatrix} \quad (6)$$

then, the coordinate value $P_0$ is given by $$\begin{bmatrix} X'_R \\ Y'_R \\ Z'_R \\ W_R \end{bmatrix} = V_R^{-1} \begin{bmatrix} x_R \\ y_R \\ z_R \\ 1 \end{bmatrix} \quad (7)$$

$$P_0 = (X_R, Y_R, Z_R) = \left( \frac{X'_R}{W_R}, \frac{Y'_R}{W_R}, \frac{Z'_R}{W_R} \right) \quad (8)$$

As a consequence, the coordinate value $P_0$ corresponding to the point 50 in FIG. 8 is obtained.

In step S46, when the nearest point $(x_n, y_n, d_n)$ is viewed in perspective by using the left virtual camera, since the point is displaced in the y-axis direction by the number of pixels representing the offset, a displaced pixel position $(X_L, Y_L, Z_L)$ is given by $$(x_L, y_L, z_L) = \left( 2 \cdot \left( \frac{x}{\text{width}} - 0.5 \right), 2 \cdot \left( \frac{y - \text{offset}}{\text{height}} - 0.5 \right), d \right) \quad (9)$$

This pixel position $(x_L, y_L, z_L)$ corresponds to the point 54 in FIG. 8. If a 3D coordinate position $P_1 = (X_L, Y_L, Z_L)$ of this point 54 which is obtained from the coordinate system of the left camera by taking an inverse perspective view is given by an inverse perspective transformation matrix $V_L^{-1}$ (substantially equal to $V_R^{-1}$) of the left virtual camera $$V_L^{-1} = \begin{bmatrix} \frac{r-l}{2n} & 0 & 0 & \frac{r+l}{2n} \\ 0 & \frac{t-b}{2n} & 0 & \frac{t+b}{2n} \\ 0 & 0 & 0 & -1 \\ 0 & 0 & \frac{-(f-n)}{2f \cdot n} & \frac{f+n}{2f \cdot n} \end{bmatrix} \quad (10)$$

then, the coordinate value $P_1$ is given by $$\begin{bmatrix} X'_L \\ Y'_L \\ Z'_L \\ W_L \end{bmatrix} = V_L^{-1} \begin{bmatrix} x_L \\ y_L \\ z_L \\ 1 \end{bmatrix} \quad (11)$$

$$P_1 = (X_L, Y_L, Z_L) \quad (12)$$
$$= \left( \frac{X'_L}{W_L}, \frac{Y'_L}{W_L}, \frac{Z'_L}{W_L} \right)$$

In step S50, the base line length is determined in accordance with the distance $|P_0 - P_1|$.

The above process is the control procedure for determining base line length.

Referring back to the flow chart of FIG. 20 showing the control procedure for stereoscopic vision parameters, a vergence angle determining process is performed in step S38 after step S36. This process will be described later.

In the above manner, optimal values of stereoscopic vision parameters such as base line length and vergence angle can be determined initially or in real time without any manual operation.

Control for Walkthrough

Figure 22:
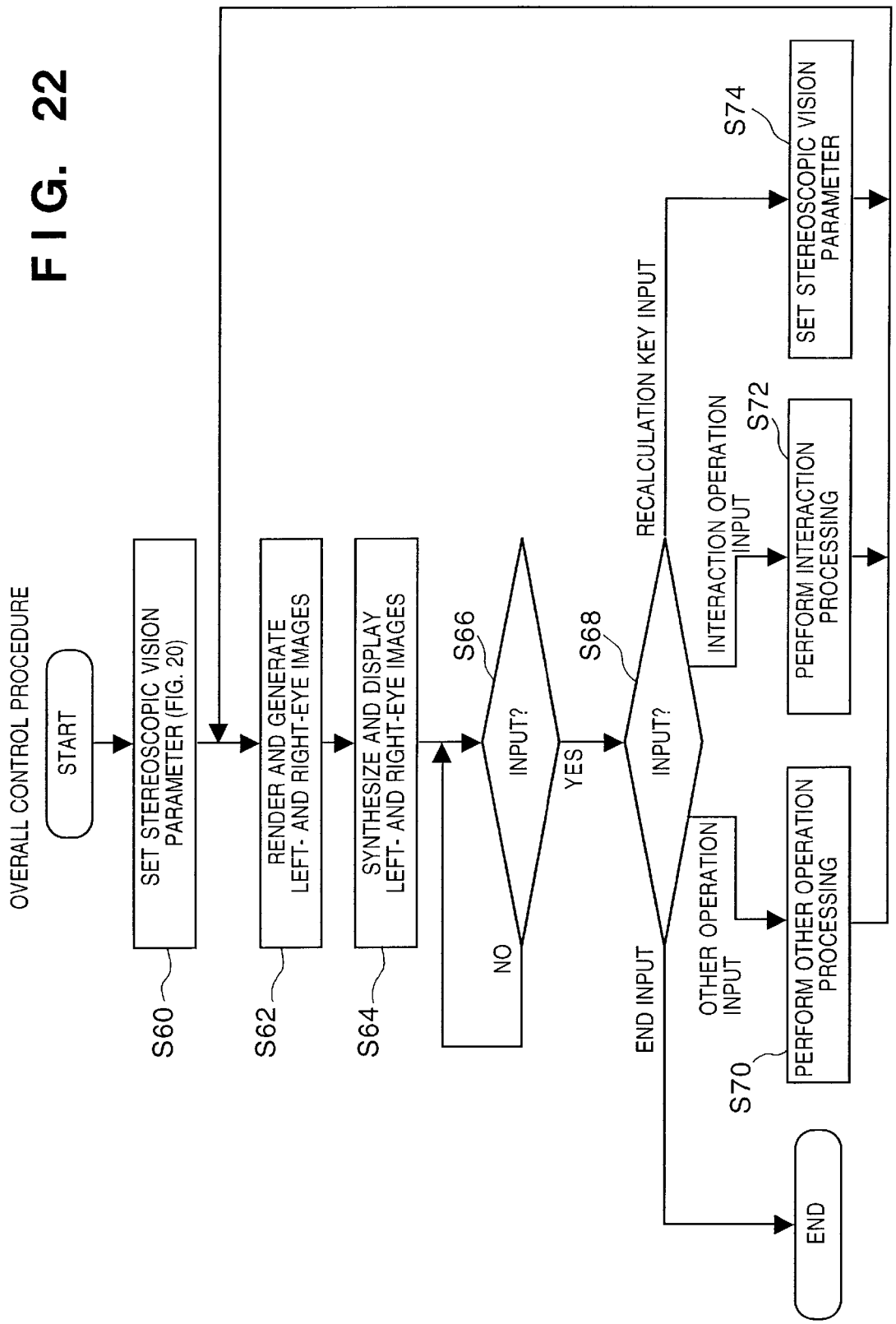
FIG. 22 is a flow chart for explaining an overall control procedure in a walkthrough application.

FIG. 22 shows a control procedure in a case wherein a stereoscopic vision parameter determining system is incorporated in a walkthrough system. In some case, a problem typical of walkthrough is that as the user moves the viewpoint position, the viewpoint point conditions change so much that the stereoscopic vision parameters must be changed. That is, the stereoscopic vision parameters must be changed in real time or on demand as the user experiences walkthrough. The control procedure shown in FIG. 22 incorporates not only the function of automatically setting optimal initial stereoscopic vision parameters but also the function of setting optimal stereoscopic vision parameters on demand from the user.

When step S60 is executed in accordance with the control procedure in FIG. 22, the stereoscopic vision parameter determining process described with reference to FIG. 20 is performed. As a consequence, optimal initial values of stereoscopic vision parameters are set in accordance with the position of the user at this time point and display specifications. Instep S62, left- and right-eye images are rendered in accordance with the stereoscopic vision parameters set in this manner. In step S64, these images are synthesized and displayed.

At the time of step S64, a virtual space for walkthrough is displayed on the screen of the display 10.

When the user designates a walkthrough direction with the mouse or the like in the above manner, the display of the virtual space changes in accordance with a moving instruction. The moving instruction is input as "instruction operation", and the corresponding operation is executed in step S72.

The user can input various commands other than "instruction operation" in step S66.

If the instruction indicates termination, this system is terminated.

When the user wants to change stereoscopic vision parameters and presses a predetermined key of the keyboard, step S74 is executed. In step S74, the stereoscopic vision parameter determining process (control procedure in FIG. 20) is executed again. That is, stereoscopic vision parameters suited to the viewpoint position of the user and conditions at this time are set again. In other words, according to the control in FIG. 22, since stereoscopic vision can be ensured regardless of a change of virtual space, this system is suited for walkthrough in a virtual space having a plurality of small spaces with different sizes.

Automatic Setting of Optimal Vergence Angle

The vergence angle determining process in step S38 in FIG. 20 is an optional processing routine. Whether vergence angle is required for stereoscopic vision depends on the application field or users in the application field. For this reason, in this system, immediately after the walkthrough application program in FIG. 22 is executed, the application program displays, on the display 10, a dialog for inquiring of the user whether to automatically set vergence angle. In this dialog, the user chooses between automatic setting of vergence angle (i.e., executing step S38) or not performing automatic setting (i.e., skipping step S38). Step S38 is executed only when it is selected.

Figure 23:
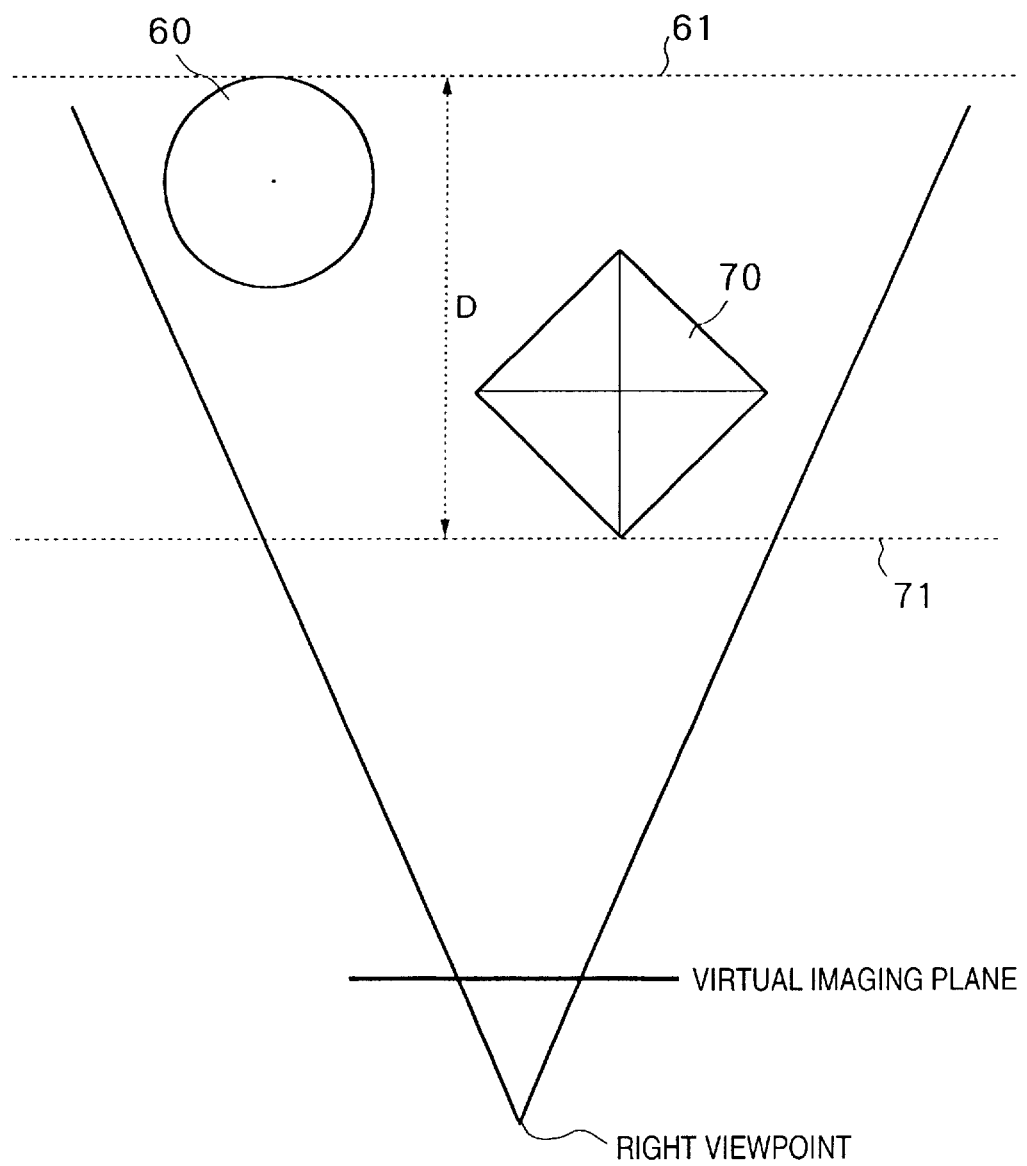
FIG. 23 is a view for explaining the principle of determining vergence angle as a stereoscopic vision parameter.
Figure 24:
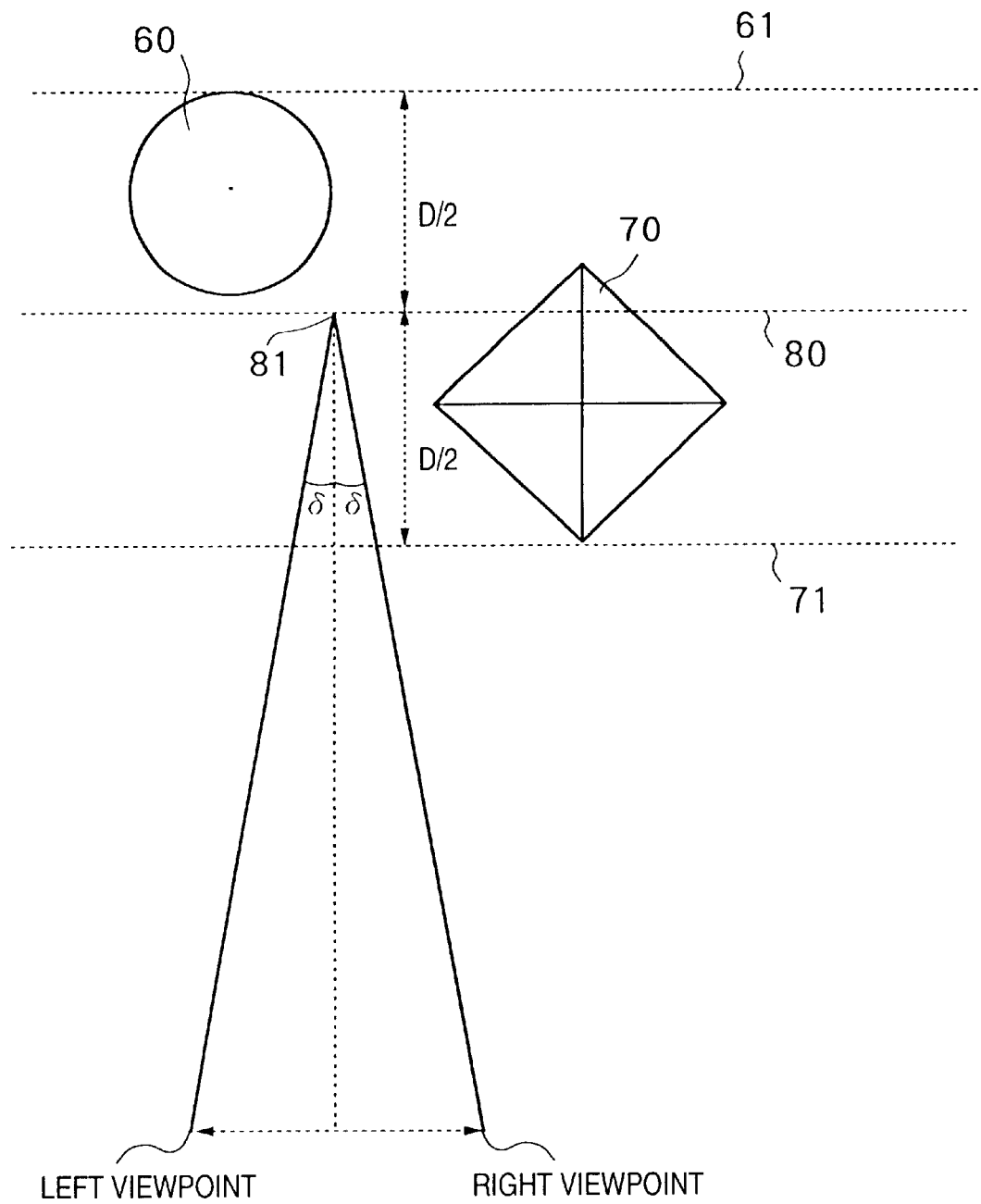
FIG. 24 is a view for explaining the principle of determining vergence angle as a stereoscopic vision parameter.

FIGS. 23 and 24 explain the principle of automatically setting vergence angle. In step S38, the vergence angle is determined on the basis of the input 3D data of a virtual space. Assume that a cone 60 and quadrangular pyramid 70 exist as virtual objects in a virtual space, as shown in FIG. 23. Obviously, virtual objects other than these two virtual objects are permitted to exist. Since these virtual objects have 3D coordinate information, the nearest and farthest points exist in this virtual space. In the case shown in FIG. 23, the nearest point is located on a vertical plane 71 on which a vertex of the quadrangular pyramid 70 exists, and the farthest point is located on a vertical plane 61 on which the circumference of the cone 60 exists. The optimal vergence angle varies depending on theories. In this embodiment, however, as shown in FIG. 24, an angle δ that is half of the angle of the vertex of the isosceles triangle defined by a point on a vertical plane 80 at the midpoint position between the vertical planes 61 and 71 and left and right virtual viewpoints is set as the vergence angle.

The reason why consideration is given to only the nearest point when the visual axes of the two virtual cameras are parallel is that the disparity amount takes the maximum value at the nearest point. If, however, the virtual cameras are not parallel to each other, i.e., the vergence angle is not 0, the disparity amount takes a maximum value at the nearest point and farthest point. If, therefore, the vergence angle is not 0, consideration must be given to both the nearest point and the farthest point.

Figure 25:
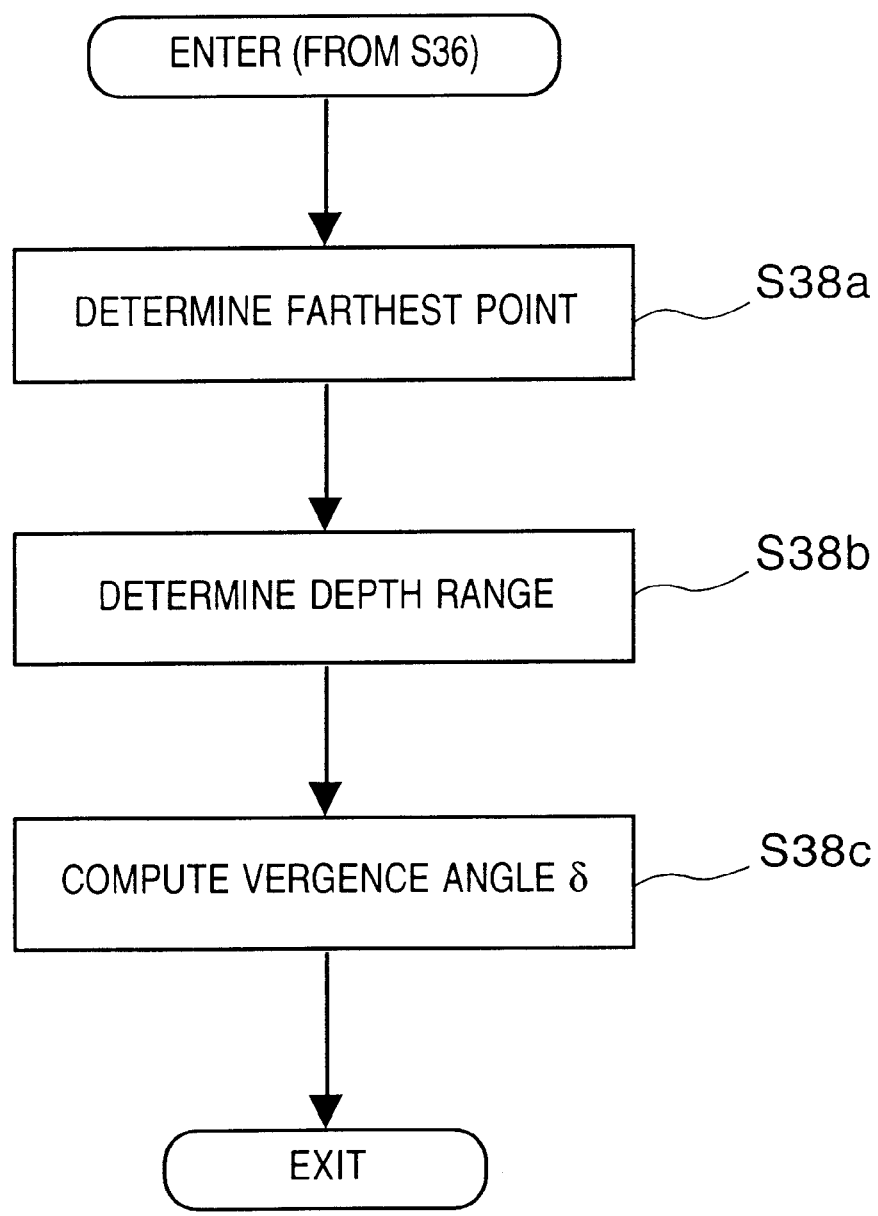
FIG. 25 is a flow chart for explaining a control procedure for determining vergence angle.

FIG. 25 shows the detailed procedure of step S38.

The nearest point has already been determined in step S34 in FIG. 20 and hence need not be obtained again to determine a vergence angle. In step S38a, a search for the farthest point is performed. For a farthest point search process, a procedure set by partly changing the nearest point search process shown in FIG. 19 can be used. More specifically, the processing in step S12 is changed to search for the farthest point by $$d_n = \max(d_i, d_n) \tag{13}$$

In step S38b, a depth range D is determined. In step S38c, the vergence angle δ is determined in accordance with the value of D/2 according to the computation technique shown in FIG. 24.

Various changes and modifications can be made without departing from the spirit and scope of the invention.

The stereoscopic vision parameter determining process represented by the control procedure shown in FIGS. 19 to 21 is employed on the assumption that the visual axes of the virtual cameras are parallel to each other (convergence angle=0). This is because the user may not suffer from fatigue when vergence angle=0. However, some 3D space data has parameters associated with convergence angle in advance. In addition, in the above embodiment, the initial convergence angle δ is automatically determined if the user wishes so. When, therefore, image data having a convergence angle in advance or image data to which a convergence angle is given later is to be processed, the base line length must be determined in consideration of the convergence angle.

Determination of base line length in consideration of convergence angle can be realized by rotation. FIGS. 26A to E explain how the principle of determining base line length without consideration of any vergence angle, which is shown in FIG. 9, is changed to perform the base line length determining process in consideration of vergence angle.

When FIGS. 26A to E and 9 are compared with each other, a point 54 is obtained by translating a nearest point 52 by a length corresponding to the maximum disparity amount on the screen in the same manner, but in case of determining base line length with consideration of convergence angle, the following different exists. In the case of no convergence angle (FIG. 9), as described above, the amount of disparity always becomes maximum at the nearest point. However, in the case where the convergence angle exists, since the amount of disparity reaches maximum either at the nearest point or the furthest point, it is necessary to calculate a base line length for both the nearest point and the furthest point.

Figure 26A:
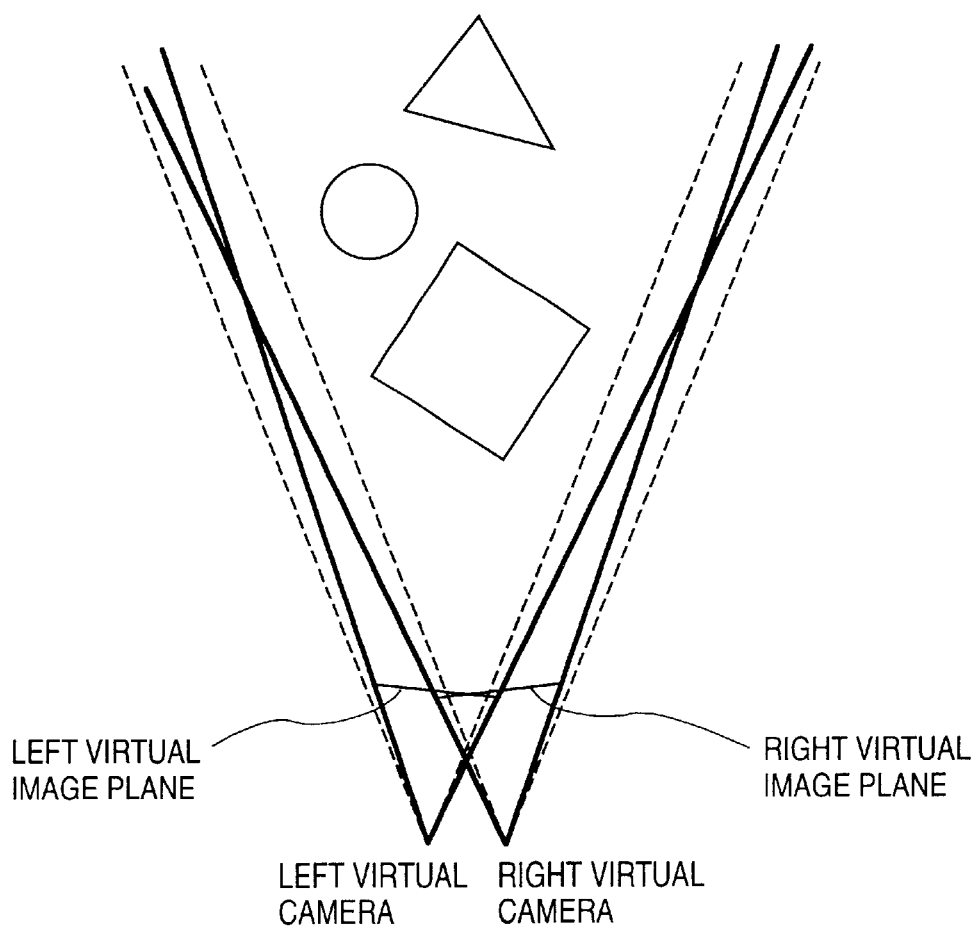

As shown in FIG. 26A, when there is a convergence angle, each virtual image plane of two virtual cameras rotates. Now, a method of obtaining a base line length will be explained. As shown in FIG. 26B, regarding the right virtual camera, a point $P_{NR}$ is obtained by projecting the nearest point $P_{near}$ on a virtual image plane. If it is assumed that the amount of disparity reaches maximum at this point $P_{near}$, the nearest point should be projected to a point $P_{NL}$ whose position is shifted from the point $P_{NR}$ by the maximum amount of disparity as shown in FIG. 26C. Then, a point $P'_{near}$ in the 3D space is obtained by taking inverse projection of the point $P_{NL}$. The distance between the points $P_{near}$ and $P'_{near}$ is a probable distance $d_n$ for the base line length.

Next, the similar processing is performed under the assumption that the amount of disparity reaches maximum at the furthest point $P_{far}$, and a probable distance $d_f$ for the base line length is obtained as shown in FIGS. 26D and 26E. It should be noted that the direction of the point shifted on the virtual image plane is opposite in FIGS. 26C and 26E. This is because, when convergence angle exists, the line of sight for both eyes crosses in the middle of the viewing space, and a viewing object exists before the crossing point in FIG. 26C while the viewing object exists behind the crossing point in FIG. 26E.

Then, one of the two probable distances $d_n$ and $d_f$ is determined for the base line length, by checking whether or not the amount of disparity at the furthest point exceeds the maximum amount of disparity when $d_n$ is applied, and also checking whether or not the amount of disparity at the nearest point exceeds the maximum amount of disparity when $d_f$ is applied, and then selecting one which does not exceed the maximum amount. If both $d_n$ and $d_f$ do not exceed the maximum amount, then the larger value is selected as the base line length.

The process shown in FIGS. 26A to E is substantially performed by adding a coordinate transformation process R, performed by the above rotation processing, and an inverse perspective transformation process $V_L^{-1}$ to the processing in step S48 (FIG. 21). If step S48 to which this rotation processing is added is referred to as step S48', the pixel position $(x_L, y_L, z_L)$ corresponding to point 54 is obtained according to equation (9) in step S46. In addition, in step S48, a coordinate value $P_2$ corresponding to the point 58 is obtained by coordinate transformation of the pixel position $(x_L, y_L, z_L)$ by $$\begin{bmatrix} X'_L \\ Y'_L \\ Z'_L \\ W_L \end{bmatrix} = [R \cdot V_L]^{-1} \begin{bmatrix} x_L \\ y_L \\ z_L \\ 1 \end{bmatrix} \tag{14}$$

$$P_2 = (X_L, Y_L, Z_L) \tag{15}$$
$$= \left( \frac{X'_L}{W_L}, \frac{Y'_L}{W_L}, \frac{Z'_L}{W_L} \right)$$

In this case, a matrix R represents rotation transformation of the angle 2δ around the y-axis. More specifically, this matrix has the following structure:

$$R = \begin{bmatrix} \cos 2\delta & 0 & \sin 2\delta & 0 \\ 0 & 1 & 0 & 0 \\ -\sin 2\delta & 0 & \cos 2\delta & 0 \\ 0 & 0 & 0 & 1 \end{bmatrix} \quad (16)$$

In addition, if the left and right virtual cameras have the same camera parameters, the matrix $V_L$ eis identical to the matrix $V_R$ (i.e., equation (2)).

In this embodiment, the stereoscopic vision parameter determining process of the present invention is applied to walkthrough. In this virtual space walkthrough, in particular, the real-time values of stereoscopic vision parameters are calculated as well as initial values.

Figure 27:
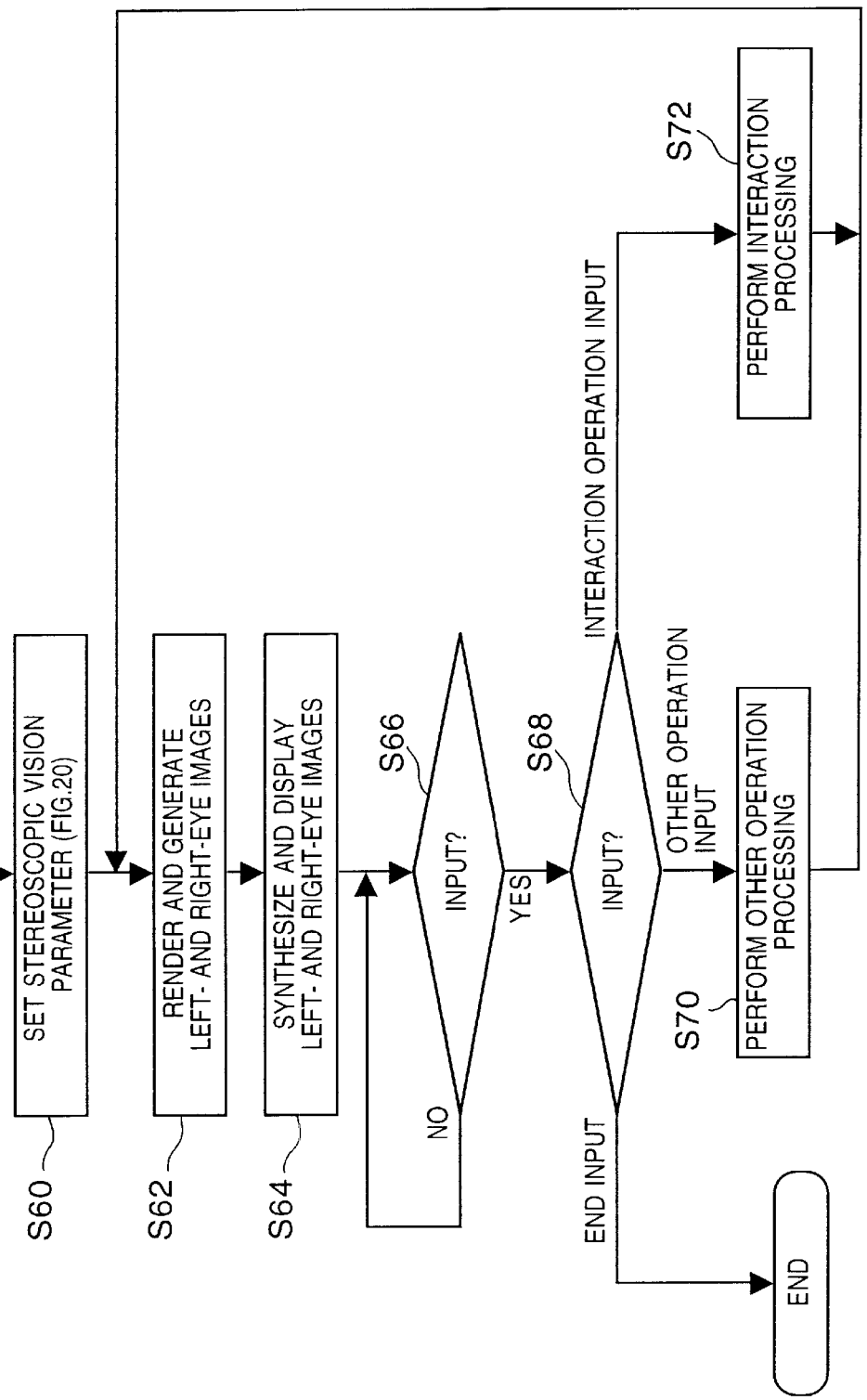
FIG. 27 is a flow chart for explaining an overall control procedure associated with a modification of the walkthrough application.

In this modification, virtual space walkthrough control is performed to compute only initial values in order to reduce the computed vergence angle as a stereoscopic vision parameter. FIG. 27 shows this procedure.

The processing shown in FIG. 27 is equivalent to the processing shown in FIG. 22 except that step S74 is omitted.

The steps having the same step numbers as in the flow charts of FIGS. 22, 27, 28, and 29 denote the steps having the same contents.

In the above embodiment, left- and right-eye images to be displayed on the display 10 are rendered every time they are synthesized. In the third modification, however, the stereoscopic vision parameter setting process (step S34 in FIG. 20) effectively use this right-eye image to reduce the calculation load as the right-eye image is rendered in step S8 in FIG. 19.

Figure 28:
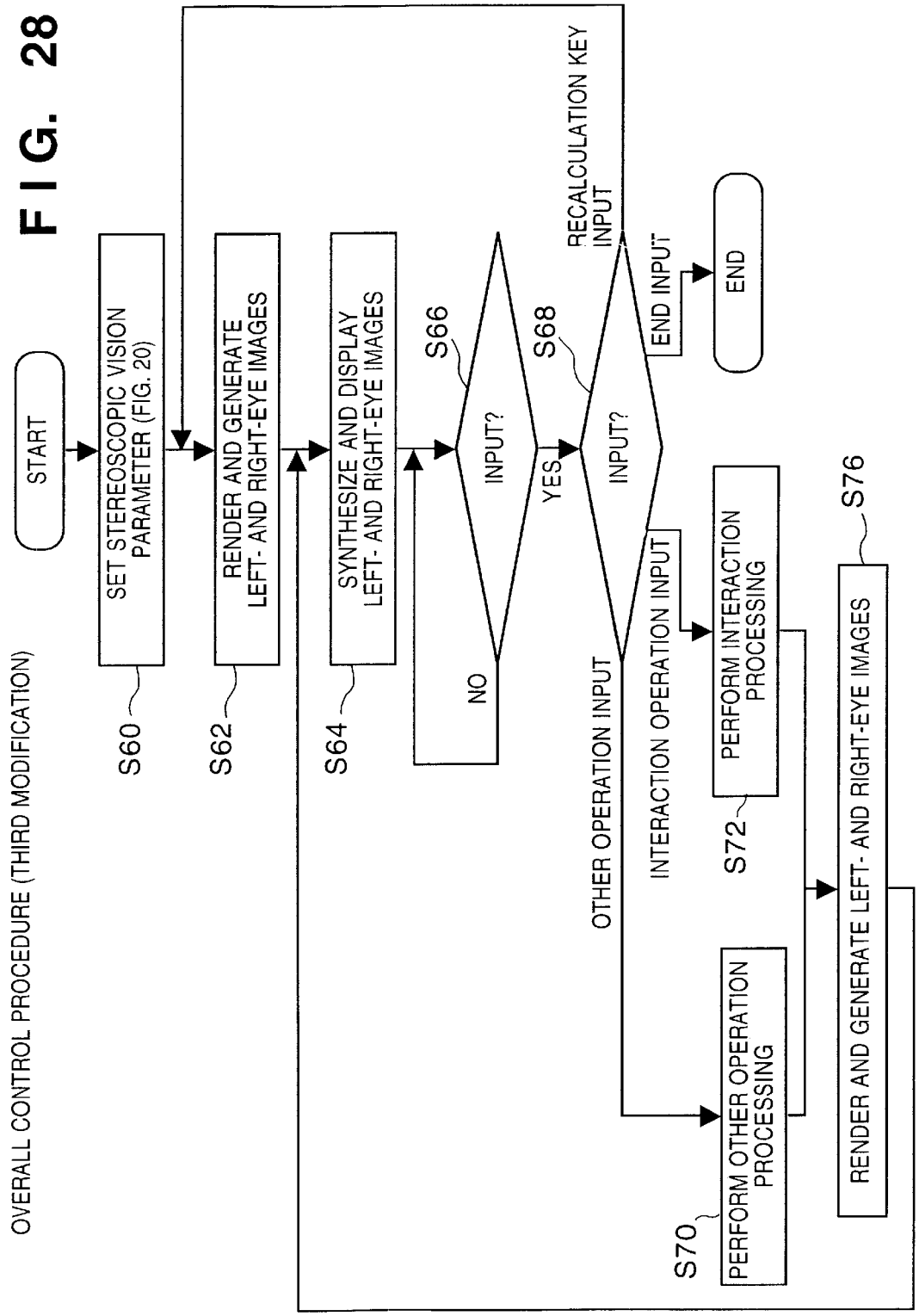
FIG. 28 is a flow chart for explaining an overall control procedure associated with another modification of the walkthrough application.

More specifically, the process of rendering left- and right-eye images in step S62 in FIG. 22 is changed into the process of rendering only a left-eye image as in step S62' in FIG. 28. In the control procedure in FIG. 28, therefore, every time a recalculation key for stereoscopic vision parameters is pressed, stereoscopic vision parameters are reset (in addition, a right-eye image is rendered in step S8) in step S60, and a left-eye image is rendered in step S62'. In step S64, the left- and right-eye images are synthesized. In an interaction process and other processes, left- and right-eye images are rendered in step S76, and these images are synthesized and displayed in step S64.

As described above, in the third modification, when stereoscopic vision parameters are reset, one step of rendering a right-eye image is omitted to contribute to an increase in processing speed.

Figure 29:
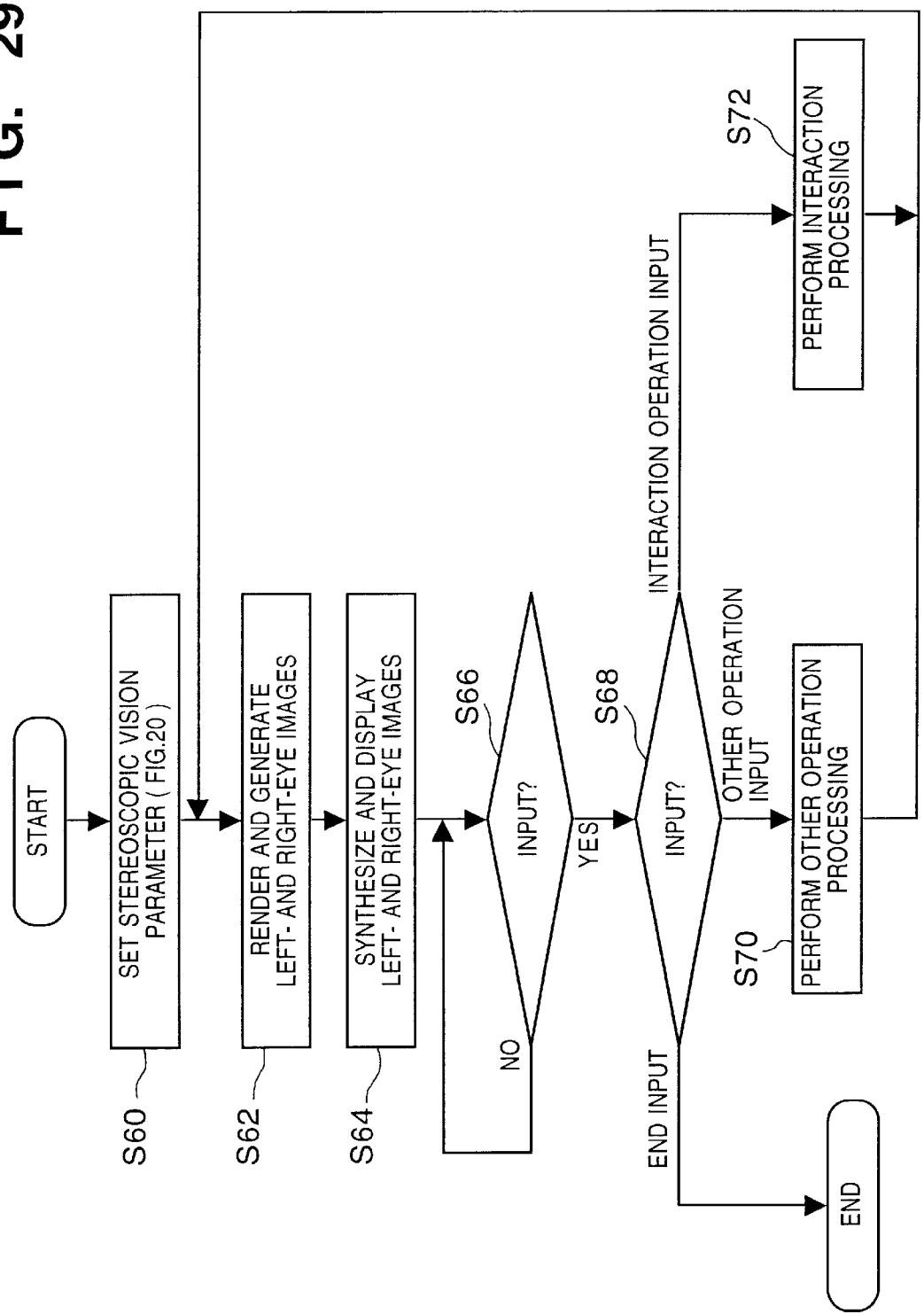
FIG. 29 is a flow chart for explaining an overall control procedure associated with still another modification of the walkthrough application.

In the fourth modification, stereoscopic vision parameters are recalculated in every operation. FIG. 29 shows a control procedure for this process. More specifically, in an interaction process and other processes, the flow returns to step S60 to reset stereoscopic vision parameters (in addition, a right-eye image is rendered in step S8), and a left-eye image is rendered in step S62'. In step S64, the left- and right-eye images are synthesized.

In the fourth modification as well, one step of rendering a right-eye image is omitted to contribute to an increase in processing speed.

Figure 30:
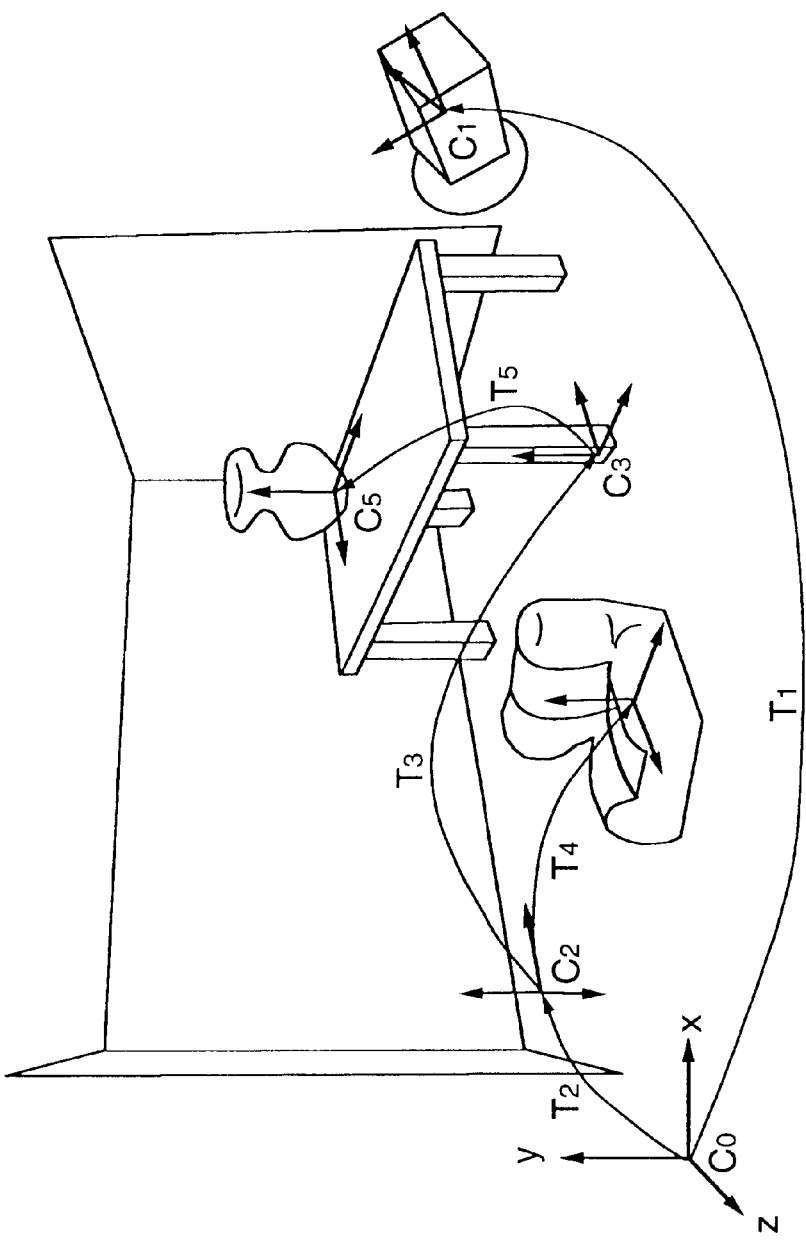
FIG. 30 is a perspective view for explaining another technique of determining the nearest point.

In the above embodiment, with the use of the depth buffer, even if a plurality of virtual objects are present, since coordinate transformation of all the virtual objects is performed in rendering, no coordinate transformation is required inside the system. In the fifth modification, as shown in FIG. 30, the coordinate systems of target objects in a 3D space are transformed into a camera coordinate system (a 3D coordinate system with the camera position being the origin) for observation, and a point nearest to the viewpoint position is directly calculated. According to the technique of this modification, consideration must be given to coordinate transformation between objects in a 3D space. In the case shown in FIG. 30, although the camera and room are designated by positions in the world coordinate system, the table and chair are designated by positions based on the coordinate system of the room. The pot is designated by a position based on the coordinate system of the table. The coordinate systems of these objects are transformed into the camera coordinate system in consideration of the relationship between these coordinate systems.

In Japanese Patent Laid-Open No. 2000-020757, the present inventor has proposed a user interface that allows a user to change stereoscopic vision parameters when he/she wishes.

Figure 31:
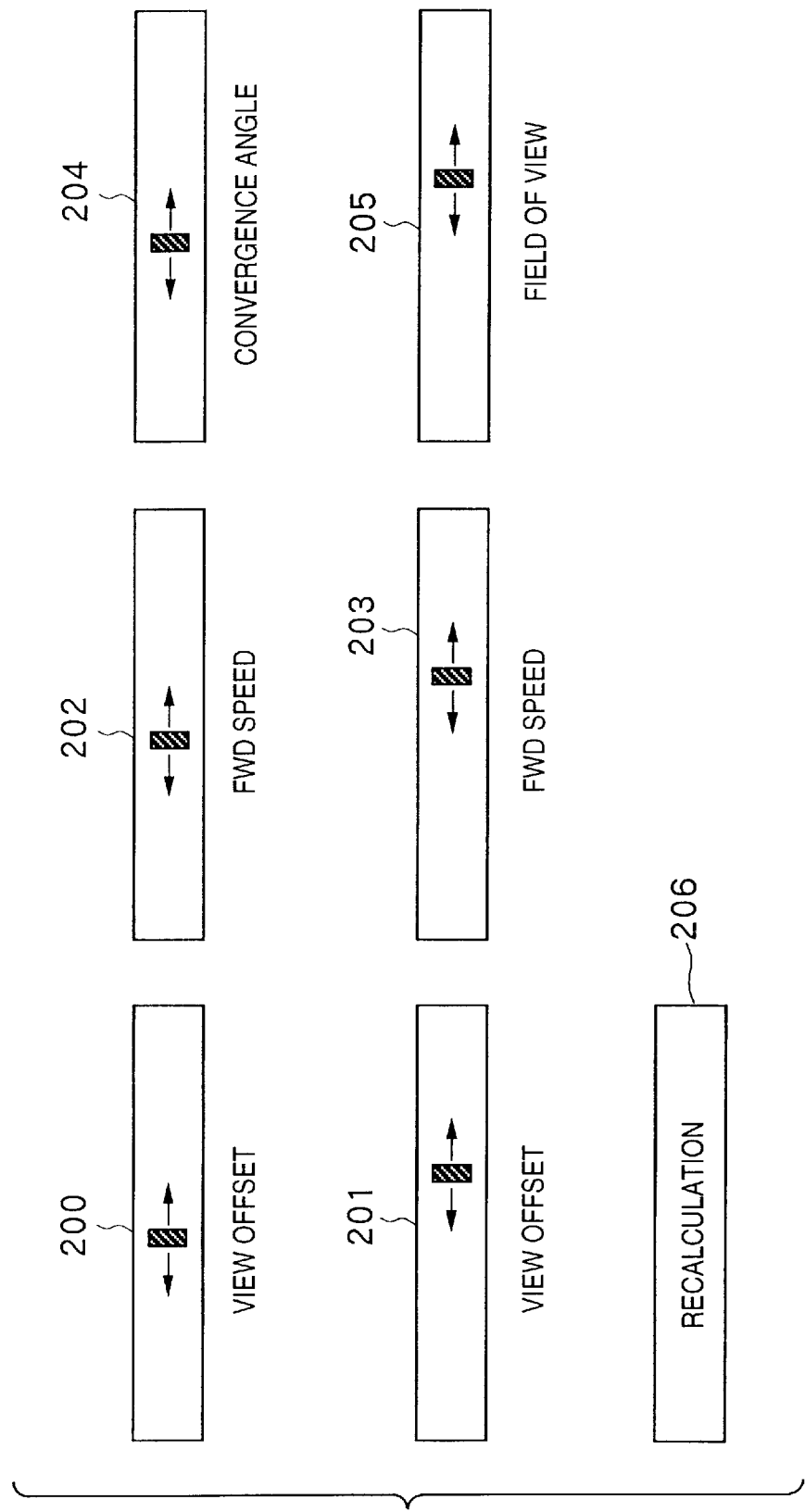
FIG. 31 is a view for explaining a user interface for allowing the user to arbitrarily set values of stereoscopic vision parameters.

FIG. 31 shows a user interface displayed on the screen of the display 10 according to the sixth modification.

Referring to FIG. 31, reference numerals 200 and 201 denote user interface tools (VIEW OFFSET) for changing a base line length b. The two tools are slide bar controls. The slide bar 200 is used to make a large change in base line length. The slide bar 201 is used to make a small change in base line length.

Referring to FIG. 31, slide bars 202 and 203 are used to change the forward moving speed (FWD SPEED). The two slide bars 202 and 203 are provided for changing operation for large amount and small amount respectively.

A slide bar 204 is used to change the vergence angle (CONVERGENCE ANGLE). A slide bar 205 is used to change the field angle (FIELD OF VIEW).

The user interface shown in FIG. 16 is operated by the user with the mouse. The moving amount of the mouse corresponds to the operation amount.

Note that the user interface tools are not limited to a slide bar in practice. A tool capable of making continuous changes in value, e.g., a jog dial, may be used.

A characteristic feature of the above embodiment is that stereoscopic vision parameters (initial values and real-time values) are automatically set. If, therefore, this apparatus further includes the user interface in FIG. 31, the resultant arrangement conflicts with the embodiment. For this reason, the control procedure may be changed such that the above stereoscopic vision parameter setting process (FIG. 20) is stopped upon detecting that one of the six bars 200 to 205 in FIG. 31 is operated by the user. If the user wishes to resume the automatic setting mode, the apparatus resumes the mode upon detecting that a key icon 206 displayed on the display 10 is pressed by the user.

According to the first to sixth modifications described above, stereoscopic vision parameters are recalculated at an optimal timing in accordance with the form of a user application or user's wish, thereby realizing high operability.

In addition, since the mode of automatically setting stereoscopic vision parameters in the present invention is realized in consideration of a case wherein the vergence angle is present on the visual axes of the virtual cameras, the application range of the mode is wide.

Although resetting of stereoscopic vision parameters is a time-consuming process, the processing load can be reduced by commonly performing a rendering process in both the step of setting stereoscopic vision parameters and the step of generating a stereoscopic image.

Other Modifications

In the above embodiment and modifications, the process of automatically setting stereoscopic vision parameters in the present invention is applied to a general virtual reality system. However, the present invention can also be applied to a so-called mixed reality system.

Mixed reality systems often use HMDs (Head-Mounted Displays). In this case, since the distance between the display screen and the user viewpoint is fixed, the distance measuring sensor 17 is not required.

As described above, according to the present invention, the optimal initial values of stereoscopic vision parameters can be automatically set.

In addition, optimal real-time values of stereoscopic vision parameters can be automatically updated.

Furthermore, the resetting timing of stereoscopic vision parameters can be set automatically or in accordance with the preference of the user.

As many apparently widely different embodiments of the present invention can be made without departing from the spirit and scope thereof, it is to be understood that the invention is not limited to the specific embodiments thereof except as defined in the claims.

What is claimed is:

1. A stereoscopic image processing apparatus for displaying an arbitrary object so as to obtain stereoscopic vision of the object, said apparatus comprising:
    a detection unit adapted to detect a predetermined object point from 3D space data to be displayed;
    a parameter determining unit adapted to determine base line length on the basis of a displacement amount of the predetermined object point in a 2D rendering space and displacement information representing a displacement amount between the left- and right-eye images in a 2D rendering space; and
    an output unit adapted to generate and output the left- and right-eye images for stereoscopic vision output by using the information determined by said parameter determining unit.

2. The apparatus according to claim 1, wherein said parameter determining unit is restarted in response to a request from the observer to recalculate a corresponding value of base line length at the viewpoint position of the observer.

3. The apparatus according to claim 1, wherein said parameter determining unit determines the base line length and a vergence angle, and the vergence angle is determined on the basis of a direction of a substantially a midpoint position in a spread in a virtual space in a depth direction which is viewed from left and right viewpoint positions of the observer.

4. The apparatus according to claim 1, wherein the predetermined object point is set at a nearest point on the object which is substantially nearest to the viewpoint position of the observer in a depth direction of a virtual space.

5. The apparatus according to claim 1, further comprising a stereoscopic image display which displays stereoscopic vision based on the generated left- and right-eye images.

6. A stereoscopic image processing method of displaying an arbitrary object so as to obtain stereoscopic vision of said arbitrary object, said method comprising:
    a detection step of detecting a predetermined object point from 3D space data to be displayed;
    a parameter determining step of determining base line length on the basis of displacement amount of the predetermined object point in a 2D rendering space and a displacement distance at which the left- and right-eye images look displaced from each other in a predetermined 2D rendering space; and
    an output step of generating and outputting the left- and right-eye images for stereoscopic vision output by using the information determined in said parameter determining step.

7. The method according to claim 6, wherein said parameter determining step comprises:
    a displacement distance setting step of presetting a displacement distance between left and right image data of the predetermined object point of the 3D space, which appears when the image data are rendered in the 2D rendering space;
    a displacement computing step of computing a position of a displaced point separated from coordinates of the object point in the 2D rendering space by the displacement distance in a base line length direction of an observer;
    a coordinate transformation step of computing coordinates of the displaced point in a 3D space; and
    a base line length determining step of determining a base line length on the basis of a distance between 3D coordinates of the displaced point and the object point.

8. The method according to claim 7, wherein a plurality of search positions in the rendering space are set to have a discrete distribution so as to quickly search for the predetermined object point that satisfies a predetermined condition in the rendering space.

9. The method according to claim 7, wherein the predetermined object point is set at a nearest point on the object which is substantially nearest to the viewpoint position of the observer in a depth direction of a virtual space.

10. The method according to claim 9, wherein the nearest point is determined to be a pixel having a minimum depth value which is selected from image data obtained by perspective transformation of 3D space data from the viewpoint of the observer's left- or right-eye.

11. The method according to claim 10, further comprising storing, via a z buffer memory, a depth value.

12. The method according to claim 10, wherein a distribution pattern of a plurality of search points in the 2D rendering space is set with a density of search points increasing toward a center so as to search for the nearest point in the 2D rendering space.

13. The method according to claim 10, wherein a plurality of distribution patterns of a plurality of search points in the 2D rendering space are set to search for the nearest point in the 2D rendering space, and
    wherein said method comprises a step of detecting a viewpoint position/posture of the observer and selecting a distribution pattern matching the position/posture.

14. The method according to claim 7, wherein said displacement computing step comprises:
    a step of performing perspective transformation of 3D space data from the viewpoint of the observer's left- or right-eye;
    a nearest point determining step of determining, as the nearest point, a pixel, of the image data subjected to perspective transformation in the step, which has a minimum depth value;
    a step of computing a position of a displaced point, in the 2D rendering space, which is separated from coordinates of the pixel having the minimum depth value by the displacement distance in the base line length direction of the observer; and
    a step of obtaining coordinates of the displaced point in a 3D space by inverse perspective transformation of one of the left- and right-eye images from another viewpoint at a position of the displaced point in the 2D rendering space.

15. The method according to claim 6, wherein said method further comprising a moving step of moving a viewpoint position of the observer, and wherein an initial value of a stereoscopic vision parameter which is determined in said parameter determining step is used for stereoscopic vision output regardless of movement of the viewpoint position.

16. The method according to claim 15, wherein said moving step comprises a sensor for detecting a moving amount of an actual viewpoint position of the observer.

17. The method according to claim 15, wherein said moving step comprises detecting a moving amount of a virtual viewpoint position of the observer.

18. The method according to claim 15, wherein, if the moving amount of the viewpoint position of the observer exceeds a predetermined value, said parameter determining step is restarted to recalculate a corresponding value of a stereoscopic vision parameter.

19. The method according to claim 15, wherein said parameter determining step is restarted in response to a request from the observer to recalculate a corresponding value of the base line length at the viewpoint position of the observer.

20. The method according to claim 6, wherein said parameter determining step is restarted to recalculate a value of a stereoscopic vision parameter at an arbitrary time point.

21. The method according to claim 6, wherein the stereoscopic vision parameter includes at least one of a base line length and vergence angle.

22. The method according to claim 6, further comprising a user interface step of manually setting a value of a stereoscopic vision parameter.

23. The method according to claim 22, further comprising a step of arbitrating between the user interface step and the stereoscopic vision parameter setting step.

24. The method according to claim 6, wherein said parameter determining step comprises determining the base line length and a vergence angle, and the vergence angle is determined on the basis of a direction of a substantially a midpoint position in a spread in a virtual space in a depth direction which is viewed from left and right viewpoint positions of the observer.

25. The method according to claim 6, wherein the displacement distance is determined in advance on the basis of a pixel size of a display apparatus on which a stereoscopic image is displayed and a distance from a display screen of said display apparatus to the observer.

26. The method according to claim 6, further comprising storing, via a memory, predetermined displacement distance values in advance in accordance with combinations of a plurality of types of display apparatuses that can be connected to the stereoscopic image processing method and distances from display screens to the observer, and a step of detecting a distance from the display screen to the observer, wherein said parameter setting step comprises reading out a displacement distance value matching a distance from the connected display apparatus to the observer from the memory.

27. A computer program storage medium storing a stereoscopic image processing program which is executed on a computer to display an arbitrary object so as to obtain stereoscopic vision of said object, said medium storing a program code for implementing the stereoscopic image processing method of claim 6.

* * * * *

UNITED STATES PATENT AND TRADEMARK OFFICE
CERTIFICATE OF CORRECTION

| | | |
|---|---|---|
| PATENT NO. | : 6,677,939 B2 | |
| APPLICATION NO. | : 09/512828 | |
| DATED | : January 13, 2004 | |
| INVENTOR(S) | : Uchiyama. | |

It is certified that error appears in the above-identified patent and that said Letters Patent is hereby corrected as shown below:

ON THE TITLE PAGE:

In The Title, "METHOD AND" should read --METHOD, AND--

In Foreign Patent Documents, please insert, --FOREIGN PATENT DOCUMENTS
   JP    2000-020757  1/2000--; and In Foreign Application Priority Data, "Aug. 7, 1999 (JP)................................11-194802" should read --July 8, 1999    (JP)............................11-194802--.

IN THE DISCLOSURE:

COLUMN 1:

Line 24, "(virtual" should read --(Virtual--; and
Line 43, "uses" should read --use--.

COLUMN 2:

Line 35, "vales" should read --values--.

COLUMN 4:

Line 42, "sapce." should read --space.--.

COLUMN 5:

Line 58, "comprising" should read --comprising:--.

COLUMN 7:

Line 13, "FIGS. 26A to E" should read --FIGS. 26A to 26E--.

COLUMN 9:

Line 9, "known well" should read --well known that--; and
Line 48, "distance 42" should read --distance 43--.

UNITED STATES PATENT AND TRADEMARK OFFICE
CERTIFICATE OF CORRECTION

PATENT NO. : 6,677,939 B2
APPLICATION NO. : 09/512828
DATED : January 13, 2004
INVENTOR(S) : Uchiyama.

It is certified that error appears in the above-identified patent and that said Letters Patent is hereby corrected as shown below:

COLUMN 11:

Line 13, "source. In" should read --source. ¶ In--.

COLUMN 12:

Line 36, "$(x_n,y_n,Z_n)$" should read --$(x_n,y_n,z_n)$--; and
Line 38, "$(X_n,Y_n,Z_n) = \{X_i,Y_i,Z_i::i=\}\ n=\{Z_n:\min(Z_i)\}$" should read --$(x_n,y_n,z_n) = \{x_i,y_i,z_i:i=\}n=\{z_n:\min(z_i)\}$--.

COLUMN 13:

Line 33, "point $X_i$" should read --point $x_i$--.

COLUMN 15:

Line 19, "$(X_L$," should read --point $x_L$--.
Line 20, "$Y_L, Z_L)$" should read --$y_L, z_L)$--.

COLUMN 16:

Line 4, "case," should read --cases,--;
Line 21, "Instep S62," should read --In step S62,--.

COLUMN 17:

Line 59, "E" should read --26E--.
Line 63, "E" should read --26E--.

COLUMN 18:

Line 1, "different" should read --difference--.

COLUMN 19:

Line 12, "eis" should read --is--; and
Line 32, "use" should read --uses--.

UNITED STATES PATENT AND TRADEMARK OFFICE
CERTIFICATE OF CORRECTION

PATENT NO. : 6,677,939 B2
APPLICATION NO. : 09/512828
DATED : January 13, 2004
INVENTOR(S) : Uchiyama.

It is certified that error appears in the above-identified patent and that said Letters Patent is hereby corrected as shown below:

COLUMN 24:

Line 7, "substantially a" should read --substantially--; and
Line 20, "method" should read --apparatus--.

Signed and Sealed this

Fifth Day of December, 2006

JON W. DUDAS
*Director of the United States Patent and Trademark Office*